US012109834B2

(12) United States Patent
Attner et al.

(10) Patent No.: US 12,109,834 B2
(45) Date of Patent: Oct. 8, 2024

(54) SEE-THROUGH SECURITY ELEMENT

(71) Applicants: LEONHARD KURZ Stiftung & Co. KG, Fürth (DE); OVD Kinegram AG, Zug (CH)

(72) Inventors: Juri Attner, Unterägeri (CH); Philipp Schuler, Morschach (CH); René Staub, Hagendorn (CH); Harald Walter, Horgen (CH); Klaus Weber, Zirndorf (DE)

(73) Assignees: LEONHARD KURZ Stiftung & Co. KG, Furth (DE); OVD Kinegram AG, Zug (CH)

( * ) Notice: Subject to any disclaimer, the term of this patent is extended or adjusted under 35 U.S.C. 154(b) by 0 days.

(21) Appl. No.: 17/616,888

(22) PCT Filed: Jun. 4, 2020

(86) PCT No.: PCT/EP2020/065543

§ 371 (c)(1),
(2) Date: Dec. 6, 2021

(87) PCT Pub. No.: WO2020/245308

PCT Pub. Date: Dec. 10, 2020

(65) Prior Publication Data

US 2022/0324248 A1 Oct. 13, 2022

(30) Foreign Application Priority Data

Jun. 6, 2019 (DE) ......................... 102019115391.3

(51) Int. Cl.
*B42D 25/351* (2014.01)
*B42D 25/324* (2014.01)
(Continued)

(52) U.S. Cl.
CPC ......... *B42D 25/351* (2014.10); *B42D 25/324* (2014.10); *B42D 25/373* (2014.10);
(Continued)

(58) Field of Classification Search
CPC ... B42D 25/328; B42D 25/351; B42D 25/445
See application file for complete search history.

(56) References Cited

U.S. PATENT DOCUMENTS 10,926,571 B2 2/2021 Brehm et al.
2011/0003166 A1* 1/2011 Brehm ................ B42D 25/351 428/209

(Continued)

FOREIGN PATENT DOCUMENTS

DE 102008013167 A1 9/2009
DE 102010054760 A1 2/2012

(Continued)

*Primary Examiner* — Kyle R Grabowski
(74) *Attorney, Agent, or Firm* — Hoffmann & Baron, LLP

(57) ABSTRACT

A see-through security element (2), a security document (1) and a method for producing a see-through security element (2). The see-through security element has a first element with one or more transparent first partial areas and at least one reflective second partial area. The see-through security element has a second element with one or more first partial areas, which in each case in transmission form a color filter matched to a respectively assigned color, and has at least one second partial area, which is formed colorless, in particular colorless transparent, or in transmission and/or reflection forms a color filter which is matched to a color which is not assigned to any of the one or more first partial area of the second element. The first partial areas of the first element and the first partial areas of the second element at least partially overlap.

40 Claims, 49 Drawing Sheets

(51) Int. Cl.

| | |
|---|---|
| ***B42D 25/328*** | (2014.01) |
| ***B42D 25/373*** | (2014.01) |
| ***B42D 25/41*** | (2014.01) |
| ***B42D 25/445*** | (2014.01) |
| *B42D 25/364* | (2014.01) |

(52) U.S. Cl.

CPC ........... *B42D 25/41* (2014.10); *B42D 25/445* (2014.10); *B42D 25/328* (2014.10); *B42D 25/364* (2014.10)

(56) References Cited

U.S. PATENT DOCUMENTS

| | | | | |
|---|---|---|---|---|
| 2011/0012337 | A1 | 1/2011 | Heim | |
| 2012/0156446 | A1* | 6/2012 | Brehm ................ | B42D 25/328 428/212 |
| 2013/0113200 | A1 | 5/2013 | Lister | |
| 2013/0264813 | A1 | 10/2013 | Quinn | |
| 2013/0285361 | A1 | 10/2013 | Staub et al. | |
| 2014/0227488 | A1 | 8/2014 | Brehm et al. | |
| 2015/0352886 | A1 | 12/2015 | Holmes | |
| 2018/0154678 | A1 | 6/2018 | Olszowka et al. | |

FOREIGN PATENT DOCUMENTS

| | | | |
|---|---|---|---|
| DE | 102013106827 | A1 | 12/2014 |
| DE | 102015106800 | A1 | 11/2016 |
| DE | 102016013242 | A1 | 5/2018 |
| DE | 102017106545 | A1 | 9/2018 |
| JP | 2009-216722 | A | 9/2009 |
| JP | 2012-533760 | A | 12/2012 |
| JP | 2014-500811 | A | 1/2014 |
| JP | 2016-513271 | A | 5/2016 |
| WO | 2011006634 | A2 | 1/2011 |

* cited by examiner

SEE-THROUGH SECURITY ELEMENT

This application is a National Stage application based on an International Application filed under the Patent Cooperation Treaty, PCT/EP2020/065543, filed Jun. 4, 2020, which claims priority to DE 102019115391.3, filed Jun. 6, 2019.

BACKGROUND OF THE INVENTION

The invention relates to a see-through security element, a method for producing a see-through security element and a security document with a see-through security element.

It is known to use see-through security elements, which are usually formed as security threads, in security documents, in particular in banknotes. For this, a plastic film is provided with an opaque coating. Openings are then introduced into the opaque coating which are formed as alphanumeric characters in reversed type. When viewed in transmitted light, these characters become visible as a feature as colorless, light characters in front of a dark background.

SUMMARY OF THE INVENTION

The object of the invention is to provide improved see-through security elements as well as a method for producing same.

The object is achieved by a see-through security element with a front side formed by a first main surface of the see-through security element and a rear side formed by a second main surface of the see-through security element, wherein the see-through security element has at least one first area and/or at least one second area, when viewed perpendicular to the plane spanned by the first main surface, wherein the see-through security element has a first element, which has one or more transparent first partial areas and at least one reflective second partial area, wherein the see-through security element has a second element, which has one or more first partial areas, which in each case in transmission form a color filter matched to a respectively assigned color, and has at least one second partial area, which is formed colorless, in particular colorless transparent, or in transmission and/or reflection forms a color filter which is matched to a color which is not assigned to any of the one or more first partial areas of the second element, wherein the first partial areas of the first element and the first partial areas of the second element at least partially overlap when viewed perpendicular to the plane spanned by the first main surface.

For the production of this see-through security element, one or more color layers, the solubility and/or color filtering effect of which can be altered by means of exposure to light, are preferably applied to the first element, and the one or more color layers are exposed to light through the first element using the first element as exposure mask.

The invention achieves the advantage of further improving the protection against forgery of see-through security elements. The invention thus makes it possible to provide see-through security elements which exhibit colored features when viewed in transmitted light and in particular exhibit a different colored appearance and/or different motifs when viewed in reflected and transmitted light. Due to the provision of these different security features through the interlinked elements of the security elements, the reproduction of and attempts to forge the latter are made more difficult. This is further also due to the fact that the security features newly provided by the invention are particularly eye-catching and striking, with the result that forgery attempts can also be recognized quickly.

Advantageous embodiments of the inventions are described in the dependent claims.

In the first area of the see-through security element the first partial areas of the first element and the first partial areas of the second element are preferably arranged register-accurate relative to one another when viewed perpendicular to the plane spanned by the first main surface such that, when viewed in transmitted light, in the first area a first colored feature becomes visible, which is invisible or almost invisible in particular when viewed in reflected light from the front side and rear side. Thus, in transmitted light, for example a singly or multiply dyed design element, which is visible in transmitted light and is invisible or almost invisible in reflected light, becomes apparent to the viewer as first feature. The production of such a security element places high demands on the register accuracy of the arrangement of the partial areas of the first and second elements, with the result that these security elements can be forged and imitated only with great difficulty.

By register or registration, or register accuracy or registration accuracy, is preferably meant a positional accuracy of two or more elements and/or layers, here in particular the elements and/or partial areas.

The register accuracy is to vary within a predefined tolerance, which is to be as small as possible. At the same time, the register accuracy of several elements, partial areas, in particular one or more film elements, films, plies and/or layers relative to each other is an important feature for increasing the process reliability.

The positionally accurate positioning is effected in particular by means of markings, in particular by means of sensorially, preferably optically detectable, registration marks or register marks. These markings, in particular registration marks or register marks, preferably either represent special separate elements or areas or layers or are preferably themselves part of the elements or areas or layers to be positioned.

A colored feature preferably represents a feature which has one or more colored areas, i.e. areas dyed in one color, at least in areas. In addition to colored areas of this type, a colored feature can have several colorless areas one after the other, which appear light or dark, for example.

The chromaticity of transmitted or reflected light can be quantified by specifying a color location in a color system. Within the framework of this application, the chromaticity of a feature or of a partial area of a feature is described by the chroma or chromaticity C* in the CIE L*a*b* color space. C* is defined as $C^*=\sqrt{(a^*)^2+(b^*)^2}$ The L* value, which is perpendicular to the color plane (a*, b*), is a measure of the lightness of the color.

In transmitted light when viewed perpendicular, a colored feature preferably has at least one partial area which has a chroma C* greater than 10, particularly preferably C* greater than 20. The standard illuminant D65, as light source, and the 10° CIE standard observer are assumed.

Preferably, in the first area of the see-through security element the one or more first partial areas of the first element are in each case completely surrounded by the at least one second partial area of the first element, and/or the one or more first partial areas of the second element are in each case completely surrounded by the at least one second partial area of the second element. Tests have shown that a particularly large color contrast between the colors which the see-through security element exhibits in the first area when viewed in transmitted light and which the see-through security element exhibits in the first area when viewed in reflected light from the front and/or rear side can be achieved when the first and second element in the first area are formed in this way. As a result, the protection against forgery is further improved.

Preferably, in the first area of the see-through security element the one or more first partial areas of the first element provided there and/or the one or more first partial areas of the second element provided there in each case have a dimension of less than 500 μm, preferably less than 300 μm, in at least one lateral direction. Further preferably, in the first area the one or more first partial areas of the first element and the one or more first partial areas of the second element in each case have a dimension between 5 μm and 300 μm, preferably between 10 μm and 200 μm, further preferably between 15 μm and 150 μm, in at least one lateral direction.

By lateral direction is meant here a direction which lies in the plane spanned by the first main surface of the see-through security element. The partial areas thus have, for example when viewed perpendicular to the plane spanned by the first main surface of the see-through security element, a width dimension of less than 500 μm, preferably less than 300 μm, and optionally preferably also a length dimension of less than 500 μm, preferably less than 300 μm.

Tests have shown that, through this measure, on the one hand the visibility of the first colored feature when viewed in transmitted light is sufficiently retained, and on the other hand the first colored feature is almost unrecognizable when viewed in reflected light from the front side and/or rear side.

For alternative embodiments it can be advantageous for the first colored feature to be visible, partially or completely, both when viewed in reflected light and when viewed in transmitted light. For this it is advantageous if, in the first area, the one or more first partial areas of the first element and the one or more first partial areas of the second element in each case have a dimension of more than 300 μm, preferably of more than 500 μm, particularly preferably of more than 700 μm, in at least one lateral direction.

In the first area of the see-through security element the first partial areas of the second element are in each case preferably superposed with an assigned partial area of the first element when viewed perpendicular to the plane spanned by the first main surface. As a result, the color contrast between the optical appearance of the first area when viewed in reflected light and when viewed in transmitted light is further increased. Thus, tests have shown that this measure prevents and/or largely prevents first partial areas of the second element from influencing the color in the first area when viewed in reflected light from the front and rear sides. This further increases the demands on the register accuracy, with the result that the protection against forgery is further improved.

In the first area of the see-through security element the first partial areas of the first element are preferably assigned to a first group of first partial areas and a second group of first partial areas. The one or more first partial areas of the first element, which are assigned to the first group, are in each case superposed with an assigned first partial area of the second element when viewed perpendicular to the plane spanned by the first main surface. The one or more first partial areas of the first element, which are assigned to the second group, in each case overlap with the at least one second partial area of the second element. This makes it possible to provide a colored first feature when viewed in transmitted light, which is multicolored and has differently colored partial areas and/or also has colorless partial areas in addition to colored partial areas.

The one or more first partial areas of the first element and the one or more first partial areas of the second element are preferably in each case shaped as a line and/or a raster element. Thus, tests have shown that particularly large contrast differences when viewed in reflected and transmitted light can be achieved through a line-based formation of the partial areas, in particular when motifs or partial motifs of the first feature are made up of fine continuous or dotted lines.

In the first and/or second area one or more first partial areas of the first element and one or more first partial areas of the second element are thus preferably in each case shaped as a thin, continuous line or portions of a line. The width of the line here is preferably chosen between 5 μm and 300 μm, preferably between 10 μm and 200 μm, further preferably between 15 μm and 150 μm. In each case the lines preferably form a line of a motif or partial motif of the first feature.

Further, it is also possible to vary the spacing of the lines and/or the width of the lines locally. As a result it is possible, for one thing, to vary the lightness of the first feature locally and further also optionally to integrate yet further additional "second line" security features in the security element, which can only be recognized with a technical aid, for example with the aid of a loupe or with the aid of a microscope.

Further, it is advantageous to form planar motifs or partial motifs of the first feature by means of raster elements, and for this purpose to shape the one or more first partial areas of the first element and/or the one or more first partial areas of the second element as corresponding raster elements, which are arranged in the form of a one- or two-dimensional raster. Here, the raster elements have a dimension between 5 μm and 300 μm, preferably between 10 μm and 200 μm, further preferably between 15 μm and 150 μm, preferably in at least one lateral direction, preferably in all lateral directions. The raster elements can be shaped as square, circular disk-shaped, rectangular and/or elliptical and/or alphanumeric and/or motif-shaped raster elements. Further, it is also possible for the raster elements to have any other desired design and thus also to be formed as an alphanumeric character, in particular as a microprint, for example.

The first partial areas of the first and/or second element forming the raster elements are preferably arranged relative to each other in spatial terms such that they form a motif or partial motif of the first and/or second feature and thus are provided, for example, in an area the design of which corresponds to the design of the motif or partial motif. Here, it is further also possible for the raster width of the raster and/or the size of the raster dots to be varied locally, in order in particular to vary the lightness of the partial motif or motif of the first feature in a corresponding manner locally. It is hereby possible to provide a first and/or second colored feature which not only has areas with different chromaticity or chroma, but also with different lightness.

The raster width of the raster is preferably chosen between 5 μm and 300 μm, further preferably between 10 μm and 200 μm, further preferably between 15 μm and 150 μm. Further, it is also possible for the raster to be a linear raster in which the raster elements follow on from each other in the direction of a line. It is hereby possible to combine the advantages of a line-based and area-based formation of the first and/or second colored feature with one another.

The surface proportion F of the one or more first partial areas of the first element is preferably smaller than 20%, preferably smaller than 10%, further preferably smaller than 5%. The surface proportion F is the ratio of the surface area of the first area which is occupied by the one or more first partial areas of the first element to the surface area of the first area which is occupied by the one or more first partial areas and the at least one second partial area of the first element. Here, the first area of the see-through security element is preferably the smallest possible rectangular area in which every edge of the rectangular area adjoins the first feature in each case at least at one point, when viewed perpendicular to the plane spanned by the first main surface.

The advantage is hereby achieved that the visibility of the first colored feature is reduced or preferably almost completely prevented when viewed in reflected light and is only made possible when viewed in transmitted light, and this first colored feature becomes visible in a particularly eye-catching manner.

The at least one second partial area of the first element preferably completely surrounds the first area of the see-through security element, when viewed perpendicular to the plane spanned by the first main surface. Starting from the first area of the see-through security element, the at least one second area of the first element preferably still extends by at least a distance d, when viewed perpendicular to the plane spanned by the first main surface, wherein d is larger than 0.5 mm, in particular larger than 0.8 mm, further preferably larger than 1 mm. Thus, starting from the first area, the second partial area of the first element preferably still completely surrounds the first area in all directions by at least the distance d.

These measures also result in the visibility of the first colored feature being further improved when viewed in transmitted light and thus the first feature appearing in an eye-catching manner to the viewer.

In the second area of the see-through security element at least one of the first partial areas of the first element and at least one of the first partial areas of the second element are preferably arranged register-accurate relative to one another when viewed perpendicular to the plane spanned by the first main surface such that, when viewed in transmitted light, in the second area a second colored feature becomes visible, which directly adjoins a third feature visible when viewed in reflected light from the front side and/or rear side. The advantage is hereby achieved that the third feature acts as reference for the second colored feature and thus forgery attempts and register deviations are easily recognizable to the viewer. As a result, the protection against forgery of the security element is further improved.

In the at least second area of the see-through security element at least one of the first partial areas of the second element preferably overlap with a first partial area of the first element when viewed perpendicular to the plane spanned by the first main surface, such that the at least one first partial area of the second element only partially overlaps the first partial area of the first element, preferably overlaps it by less than 50%, further preferably overlaps it by less than 30%.

It is hereby achieved that a second colored feature, which differs from the design of the first element, can be provided in the second area when viewed in transmitted light. Further, it is advantageous here if the at least one first partial area of the second element forms a motif which differs from the design of the overlapped first partial area of the first element and becomes visible in the second area as a colored second feature when viewed in transmitted light. The advantage is hereby achieved that the recognizability of the second colored feature when viewed in transmitted light is further improved.

The at least one first partial area of the second element preferably adjoins the at least one second partial area of the first element largely directly in areas here, in spite of the formation of a different motif, preferably without an overlap and without a visible gap. The advantage is hereby achieved that register deviations can easily be recognized and thus the protection against forgery is further improved.

In the first and/or second area of the see-through security element the first partial areas of the second element preferably in each case have an overlap of not more than 100 μm, preferably not more than 50 μm, further preferably not more than 10 μm with the at least one second partial area of the first element, when viewed perpendicular to the plane spanned by the first main surface. The advantage is hereby achieved that a particularly high color contrast can be achieved between the security element when viewed in transmitted light and when viewed in reflected light.

In the first and/or second area of the see-through security element the first partial areas of the second element preferably do not overlap with the at least one second partial area of the first element, when viewed perpendicular to the plane spanned by the first main surface.

In the first and/or second area of the see-through security element the at least one second partial area of the first element and the one or more first partial areas of the second element, when viewed perpendicular to the first main surface, preferably adjoins each other without overlapping and, at least in areas, with a gap with a width S of less than 300 μm, preferably less than 50 μm, further preferably seamlessly. The advantage is hereby achieved that, for one thing, the color contrast between viewing in reflected and/or transmitted light can be improved and furthermore register deviations and forgery attempts become immediately recognizable to the viewing.

Preferably, in the first and/or second area a third feature determined by at least one of the second partial areas of the first element becomes visible when viewed in reflected light from the front side and/or a third feature determined by at least one of the second partial areas of the first element becomes visible when viewed in reflected light from the rear side. The third features visible when viewed in reflected light from the front and rear sides preferably differ here from each other, in particular in their color. As a result, the protection against forgery is further improved.

In the second area of a colorless fourth feature determined by the design of at least one of the first partial areas of the first element preferably becomes visible when viewed in transmitted light. As a result, the protection against forgery is further increased.

The at least one second partial area of the first element preferably has an optical density of more than 0.8 OD, preferably of more than 1.1 OD, further preferably of more than 1.3 OD and in particular preferably of more than 1.5 OD, averaged over the visible wavelength range. The colors visible to humans lie in the range between 380 nm [violet] and 780 nm [dark red] of the electromagnetic spectrum, wherein the relative sensitivity of the eye below 430 nm and above 690 nm is less than 1% of the maximum value at 555 nm. For this reason, by the visible wavelength range is meant here in particular the wavelength range between 430 nm and 690 nm.

The one or more first partial areas of the second element preferably have, when measured in transmission, an associated L* value (CIE L*a*b* color space) greater than 5, preferably greater than 10, further preferably greater than 20.

Through the above-mentioned measures, no doubt by improving the contrast, the visibility of the first and fourth feature is further improved when viewed in transmitted light.

The at least one second partial area of the first element has a reflectivity, in particular relative to a pure mirror surface, of more than 40%, further preferably of more than 70%, averaged over the visible wavelength range.

By reflectivity is meant here the proportion of the irradiated light which is reflected back, backscattered or diffracted back.

By "transparent" is meant an in particular averaged light transmission of more than 30%, further preferably of more than 50%, preferably of more than 80%, in at least one wavelength range of visible light, preferably in the visible wavelength range (in particular between 430 nm and 690 nm), and in particular in the entire spectrum of visible light. This light transmission is preferably measured perpendicularly through the security element.

The one or more first partial areas of the first element are preferably formed reflective. By reflective is meant here that more than 10%, further preferably more than 20% of the light incident on the one or more first partial areas, when viewed in reflected light from the front and/or rear side, is reflected back, backscattered or diffracted back, for at least one wavelength range, preferably averaged over the visible wavelength range (in particular between 430 nm and 690 nm). The one or more first partial areas of the first element can be formed reflective for example by applying a highly refractive material, e.g. ZnS or $TiO_2$, or by applying a very thin metal layer, e.g. an aluminum layer with a transmission in the range of from 0.1 OD to 0.5 OD.

Tests have shown that the visibility of the first feature, when viewed in reflected light, is "blurred" when the one or more first partial areas are formed in this way, in particular in combination with the measures already specified above for this, i.e. in particular a corresponding formation of the one or more first partial areas of the first elements with at least one lateral dimension of less than 300 μm, preferably between 5 μm and 300 μm, further preferably between 10 μm and 200 μm, further preferably between 15 μm and 150 μm.

The at least one second partial area of the first element is preferably formed by at least one metallic layer or a sequence of layers comprising at least one metallic layer.

Here, the at least one metallic layer is preferably not provided and/or is removed in the one or more first partial areas of the first element. When one or more metallic layers are used it has proved effective here to aim for the above-mentioned requirements for reflectivity and optical density of the at least one first partial area of the first element and thus to ensure that the first colored feature becomes visible when viewed in transmitted light, but is "blurred" when viewed in reflected light.

Instead of one or more metallic layers, which are applied by means of a metallizing process, for example vacuum deposition, it is also possible to print on layers containing metallic pigments.

The at least one second partial area of the first element preferably has a second relief structure and at least one reflective layer, which follows the contour of the relief structure on at least one main surface, preferably on both main surfaces. Here, the reflective layer is preferably a metallic layer.

Through the second relief structure in combination with the reflective layer an optically variable third feature is preferably provided, in particular in the first and/or second area of the see-through security element. Here, it is further also possible for the at least one second partial area of the first element not only to have one reflective layer, which follows the contour of the relief structure on at least one main surface, but preferably for two or more such reflective layers to be provided, which preferably follow different relief structures on at least one main surface. It is hereby possible to generate optically variable third features which are different when viewed in reflected light from the front and rear sides, and thus to further improve the protection against forgery of the security element.

The see-through security element preferably further has a third element, which has one or more transparent first partial areas and at least one reflective second partial area. The second element is here preferably arranged in the see-through security element between the first element and the third element, in particular when viewed perpendicular to the plane spanned by the first main surface.

The third element is preferably formed like the first element, such that reference is made to the relevant previous statements relating to the first element.

The one or more transparent first partial areas of the first element and the one or more transparent first partial areas of the third element preferably overlap at least in areas, in particular are superposed. It is further advantageous if the at least one reflective second partial area of the first element and the at least one reflective second partial area of the third element overlap at least in areas, are preferably superposed, when viewed perpendicular to the plane spanned by the first main surface.

The advantage can further hereby be achieved that the optical appearance of the see-through security element exhibits correspondingly different optical effect when viewed in reflected light from the front and rear sides when the first element and the second element are designed in a corresponding manner, and in addition the previously described advantages of the invention, in particular the previously described behavior in reflected or transmitted light, are retained.

It is further advantageous if one or more of the first partial areas of the second element at least partially overlap the at least one second partial area of the first element and/or of the third element. It is hereby possible for the one or more first partial areas of the second element, which in each case in transmission form a color filter matched to a respectively assigned color, to be provided by a dyed varnish layer, wherein this dyed varnish layer is in part and partially applied overlapping with the second areas of the first element and/or third element. The dyed varnish layer is preferably provided between the two opaque reflective layers lying one on top of the other, one of which is provided by the first element and the other of which is provided by the third element.

One or more first partial areas of the first element preferably have a first relief structure. The first relief structure is preferably a relief structure which has an optically variable effect when viewed in transmitted light. It is hereby possible to integrate further optically variable effects in the first and/or second feature.

The first and/or second relief structure is preferably, as already mentioned above, a relief structure which generates an optically variable effect. These relief structures are preferably a relief structure selected from: diffractive structure, in particular hologram, zero-order diffraction grating, matte structure, in particular anisotropic matte structure, achromatic structure, in particular microlens structure, micromirror structure or microprism structure.

Movement effects and/or color change effects are preferably provided here as optically variable effects. Tests have shown that the visibility of the first feature when viewed in reflected light is hereby additionally further blurred for the human viewer.

The at least one second partial area of the first element preferably has a color flop effect when viewed in reflected light from the front and/or rear side. For this purpose, the at least one second partial area of the first element in particular has a thin-film layer stack for generating a color flop effect by means of interference and/or at least one liquid crystal layer and/or one or more layers comprising optically variable pigments, in particular interference layer pigments. Through this measure, further optically variable effects are provided, in particular in the third feature, when viewed in reflected light from the front and/or rear side, and as a result the protection against forgery is further improved.

The one or more second partial areas of the first element preferably comprise a volume hologram. Through this volume hologram, optically variable effects are preferably provided in the third feature when viewed in reflected light from the front and/or rear side. The protection against forgery is also further improved through this measure.

The at least one second partial area of the first element preferably has one or more varnish layers, which are dyed in particular by means of a colorant, in particular a dye and/or a colored pigment. These measures make it possible for differently colored third features to be provided when viewed in reflected light from the front and rear sides, and thus for the protection against forgery to be further improved.

The above-described measures for forming the at least one second partial area of the first element can be combined with each other in any desired manner. Further, the layers proposed above for this can also be provided only in areas and in particular patterned in the at least one second partial area of the first element, with the result that the effects described above in each case for this are provided only in areas by the at least one second partial area of the first element. The layers specified above for this are here preferably not provided or are removed in the one or more first partial areas of the first element, in order thus to design the one or more first partial areas of the first element transparent.

The color or the colors of the first and/or second colored features preferably correspond to the color or the colors which is or are assigned to the one or more first partial areas of the second element.

However, it is further also possible for the see-through security element to have another one or more further color filter layers, which at least partially overlap the one or more first partial areas of the second element, when viewed perpendicular to the plane spanned by the first main surface of the see-through security element. It is hereby possible, by corresponding color mixing, additionally to influence the color or the colors of the first colored features in order thus to achieve a corresponding deviation of the color or the colors of the first colored feature from the color or the colors which is or are assigned to the one or more first partial areas of the second element.

The color or the colors of the first colored feature preferably does not correspond with any color which the see-through security element exhibits in the first area when viewed in reflected light from the front and/or rear side. As a result, the recognizability of the first colored feature is further improved and further, as a result, the protection against forgery of the see-through security element is also further improved.

According to an embodiment example, the first and/or second colored feature are formed monochromatic. This is preferably achieved in particular by assigning the same color in each case in one or more first partial areas of the second element in the first and/or second areas of the see-through security element.

A monochromatic design of the first and/or second feature improves the recognizability of the first and/or second colored feature.

According to a further embodiment example, the first and/or second colored feature is formed multicolored and has partial areas with different colors.

For this, in the first and/or second areas of the see-through security element the first partial areas of the second element are preferably assigned to two or more groups of partial areas. Each of the groups of first partial areas is assigned to a respective color. The colors assigned to the groups differ from each other here. The color filters which are formed in the respective first partial areas are matched to the respectively assigned color.

Thus, in each case a first color is in particular assigned to a first group of first partial areas of the second layer, in each case a second color is assigned to a second group of first partial areas of the second layer, and optionally in each case a third color is assigned to a third group of first partial areas of the second layer. The first, second and third colors differ from each other here.

This measure makes it possible to form the first and/or second security feature multicolored and thus to further improve the protection against forgery due to the requirements of the register-accurate arrangement of correspondingly different color filters.

The one or more first partial areas of the second element are preferably formed by at least one transparent color layer, or formed of a sequence of layers comprising at least one transparent color layer. Here, the at least one transparent color layer is preferably not provided and/or is removed in at least one second partial area of the second element.

The transparent color layer preferably consists of a varnish, in particular a photoresist, which is correspondingly dyed with a colorant, in particular a dye or a pigment, in that in transmission the color layer forms a color filter which is matched to the assigned color.

The second element further preferably has a photochromic layer or is formed by a photochromic layer, which is activated in the one or more first partial areas of the second element by irradiation and is not activated in the at least one second partial area of the second element, or vice versa. The activation of the photochromic layer is preferably effected here by means of irradiation with a wavelength outside that of visible light, for example by means of UV radiation. The photochromic layer is here correspondingly formulated in order to correspondingly provide the corresponding color filter effects, as described above, in the one or more first partial areas of the second element and the at least one second partial area after exposure to light.

For the production of the see-through security element, it has further proved effective first of all to create the first element and then to use the first element as an “exposure mask” for structuring one or more layers of the second element. It is hereby possible to “position” first and/or second partial areas of the second element register-accurate relative to first and/or second partial areas of the first element and hereby to achieve the above-described effects.

As already stated above, the first element preferably has at least one or more metal layers. These one or more metal layers are preferably removed in the one or more first partial areas of the first area by means of demetallization in order to achieve the above-described optical properties in the one or more first partial areas.

As soon as the first element is finished, one or more color layers are preferably printed on preferably by means of a printing process, preferably in each case only partially printed onto the first element. Here, the one or more color layers are preferably printed onto the first element next to one another and/or also overlapping. Here, it is further also advantageous if two or more different color layers are printed on, in particular color layers are printed on which in each case in transmission form color filters which are matched to different colors. These two or more different color layers can here be applied to the first element lying next to one another and/or partially overlapping.

Here, the one or more color layers are preferably in each case formed of a dyed, negative, radiation-sensitive or radiation-activatable photoresist and/or by a photochromic material, as already stated above.

It is further possible for one or more, in particular colored, blocking layers additionally to be applied to the first element, in particular to be printed on patterned.

By a blocking layer is here meant a layer which is "impermeable" to the wavelength used for the exposure to light or irradiation such that any photoresist layers and/or photochromic layers lying under it are not activated by the exposure to light.

Just like the dyed photoresist layer, the blocking layer can be applied in part by means of digital printing, for example by means of inkjet printing. Individual markers of individual see-through security elements can thereby be produced.

A dyed photoresist layer can also be applied over the whole surface and the exposure to light can be carried out only in part. This exposure to light can be effected via a mask, for example, and/or by means of controllable UV light-emitting diodes.

After this layer has been applied, a corresponding exposure of the one or more color layers to light is then effected through the first element, as a result of which a corresponding activation of the photochromic layer or of the in particular negative photoresist is effected register-accurate relative to the one or more first partial areas of the first element.

The security element is preferably formed as a laminating film, as a transfer film or as an inlay.

The see-through security element is preferably in the form of a security thread or of a security strip or of a patch. However, the see-through security element can further also be provided over the whole surface in a security document, for example an ID document.

The see-through security element is preferably integrated, as security element, in a security document, for example in an ID document, in a banknote, in a security and/or a certificate. It is advantageous here if the security document has a transparent or translucent layer structure or has one or more openings in the form of windows at least in areas. The see-through security element is here applied to the security document and/or integrated in the layer structure of the security document in such a way that the see-through security element overlaps a transparent or translucent area of the security document and/or one or more of the windows introduced into the security document at least in areas, when viewed perpendicular to the plane spanned by the first main surface of the security element.

In an alternative embodiment, the see-through security element is applied to or integrated in a security document such that it does not overlap with a transparent or translucent area of the security document and/or with one or more of the windows introduced into the security document. It is advantageous here if the security document is still sufficiently permeable to light in the area of the applied see-through security element such that the see-through security element can still be checked, in a similar manner to a watermark in a banknote. A sufficiently light-permeable security document is a paper banknote, for example, since in this case, when it is held against a bright light source, a sufficient quantity of light passes through for the human eye to check the see-through security element.

BRIEF DESCRIPTION OF THE DRAWINGS

In the following, the invention will be explained by way of example with reference to several embodiment examples with the aid of the attached figures.

DETAILED DESCRIPTION

FIG. 1 shows a schematic top view of a security document 1. The security document 1 is preferably a banknote. However, it is also possible for the security document 1 to be an ID document, a certificate, a ticket, for example.

The security document 1 has a substrate 10, into which a transparent window 11 is introduced.

The substrate 10 is preferably a paper substrate, a plastic substrate and/or a substrate comprising paper and plastic layers. The window 11 can here be introduced into the substrate 10 by an opening having been introduced into the substrate 10 of the security document 1 in this area and/or by forming the layers of the substrate 10 provided there transparent in this area.

Figure 1A:
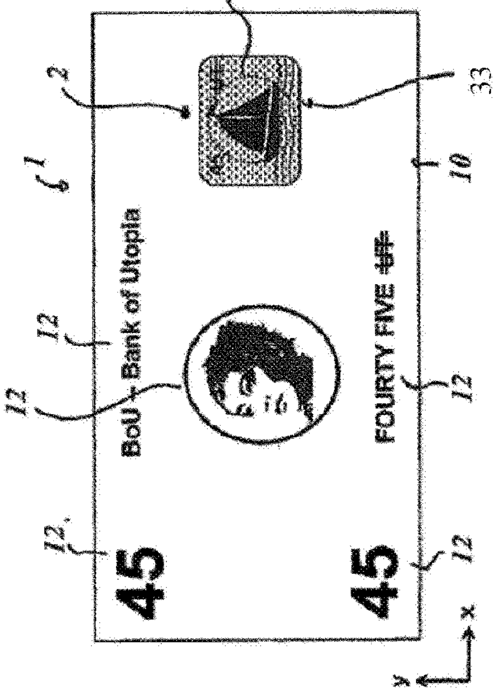
FIG. 1*a* and FIG. 1*b* show a top view of a security document with a see-through security element.

A window security element 2 is provided in the security document 1 in the area of the window 11. As indicated in FIG. 1*a*, the window security element 2 can here have a patch shape, for example a size of 28 mm×21 mm. The see-through security element 2 preferably overlaps the window 11 here at least in areas and preferably completely covers the window 11. As shown in FIG. 1*a* for example, the see-through security element 2 here preferably has a larger size dimension than that of the window 11, completely overlaps the window 1 and furthermore has an outer contour different from the window 11, here for example a rectangular outer contour with rounded corners, compared with the circular boundary line of the window 11.

Here, the security element 2 is preferably applied to one of the main surfaces of the substrate 10, for example applied to one of the main surfaces of the substrate 10 in the form of a laminating or transfer film.

However, it is also possible for the see-through security element 2 to be integrated in the layer structure of the substrate 10, for example by introducing it into a paper ply of the substrate, between two paper plies of the substrate 10 and/or, optionally also over the whole surface, between plastic plies of the substrate 10, during the production process.

Further, it is also possible for the see-through security element 2 to have a different design. For example, the see-through security element 2 can be formed as a security thread or security strip, which in particular spans the entire area of this security document from one longitudinal edge to another longitudinal edge.

Further, it is also possible for the see-through security element to have the same size extent as the substrate 10 and to be applied over the whole surface of the substrate 10 or to be integrated between layers of the substrate 10. This is advantageous in particular when the security document 1 is a card-shaped security document, for example in the form of an ID document, or the data page of a book-shaped document.

The security document 1 is preferably printed on the front and/or rear side and/or provided with further security elements. Thus, the security document 1 has yet more security features 12, for example on the front side shown in FIG. 1*a*. The security features 12 are in each case, for example, an overprint with a security ink, for example an optically variable ink, and/or further, preferably optically variable security elements, which are applied to the substrate 10 or integrated in the substrate 10.

Figure 1B:
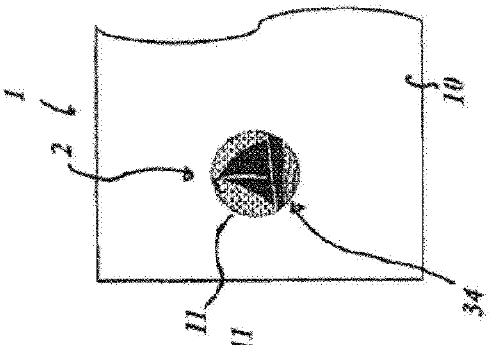

In the embodiment example according to FIG. 1*a* and FIG. 1*b*, FIG. 1*a* illustrates a schematized top view of the front side of the security document 1 and FIG. 1*b* illustrates a schematized top view of the rear side of the security document 1.

In this embodiment example, the see-through security element 2 is applied to the front side of the substrate 10. When viewed from the front side in reflected light a feature 33, in particular an optically variable feature 33, is generated by the see-through security element 2, when viewed from the rear side in reflected light a feature 34, in particular an optically variable feature 34, is generated and when viewed in transmitted light a colored feature 31 is generated. Here, the optically variable features 33 and 34 can represent identical motifs, except for having a mirrored appearance. However, the optically variable features 33 and 34 can also represent different motifs.

Figure 1C:
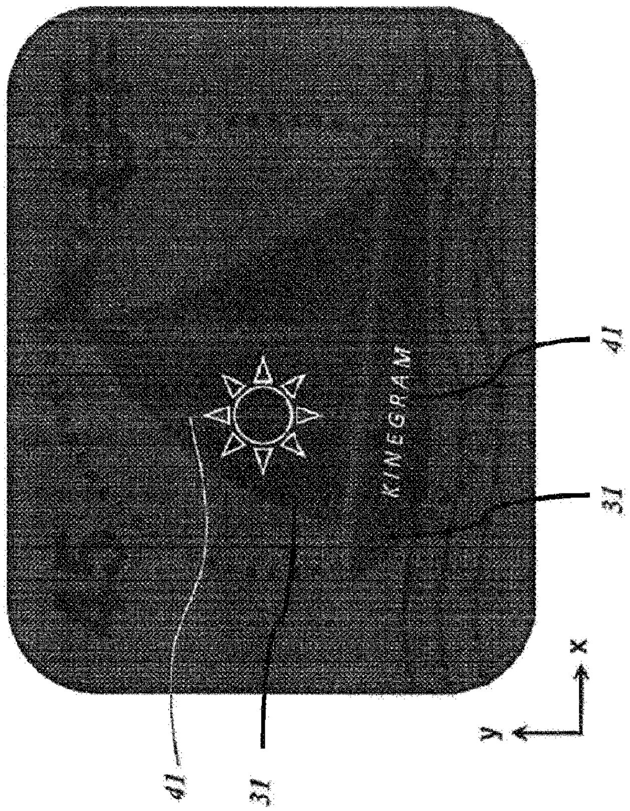
FIG. 1*c* shows a top view of a see-through security element.

FIG. 1*c* shows the colored features 31 which become visible when viewed in transmitted light in a respective area 41 by way of example. These colored features 31 are here, for one thing, a colored symbol in the form of a "sun" and, for another, the lettering "KINEGRAM", which become visible here when viewed in transmitted light. In FIG. 1*c*, the colored areas are here indicated by white lines.

Figure 1D:
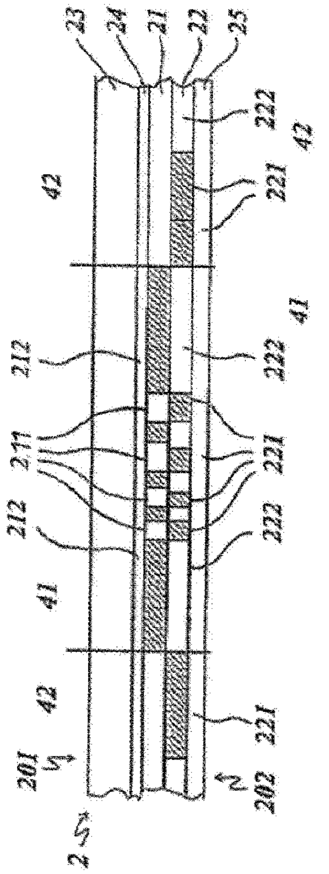
FIG. 1*d* shows a sectional representation of a see-through security element.

The basic structure of the see-through security element 2 is shown schematically in FIG. 1*d*: the see-through security element 2 has a first main surface 201 and a second main surface 202 lying opposite it. Here, the main surface 201 forms the front side of the see-through security element 2 and the main surface 202 forms the rear side of the see-through security element 2.

The see-through security element 2 has a first element 21, a second element 22 and optionally another one or more further layers, of which a carrier layer 23, a varnish layer 24 and an adhesive layer 25 are shown in FIG. 1*d*.

The carrier layer 23 is formed, for example, by a plastic film, for example a PET film or PC film (PC=polycarbonate) with a thickness between 10 μm and 300 μm. This substrate layer 23 can here further also comprise several layers, for example one or more additional varnish layers and/or adhesion-promoting layers and/or detachment layers. Here, the carrier layer 23 preferably has one or more detachment or adhesion-promoting layers on its side oriented towards the varnish layer 24. If one or more detachment layers are provided here, the see-through security element 2 is a transfer film. If one or more adhesion-promoting layers are provided, the see-through security element is a laminating film. However, it is also possible to omit such detachment and/or adhesion-promoting layers and/or the carrier layer 23. This is the case in particular when the see-through security element 2 is arranged between one or more layers of the security document 1 and/or the window 11 is not formed by a through hole in the substrate 10 of the security document, but by a transparent area of the security document 1.

The varnish layer 24 preferably consists of a protective varnish layer and/or a varnish layer in which a relief structure is molded. It is also possible here for two or more such varnish layers 24 to be provided in the see-through security element 2.

Here, the varnish layer 24 is preferably arranged between the carrier layer 23 and the first element 21 in the see-through security element 2.

The first element 21 has one or more first transparent partial areas 211 and at least one reflective, in particular highly reflective second partial area 212.

Here, the first element 21 preferably has one or more metal layers, for example consisting of aluminum, copper, gold, silver, chromium. Here, the one or more metal layers of the first element 21 are preferably not provided in the one or more first partial areas 211 or are removed again by demetallization, with the result that the transparency of the first element 21 in this partial area is not impaired by the one or more metal layers. Thus, preferably no layers of the first element 21 are provided or only transparent layers of the first element 21 are provided in the one or more first partial areas 211 of the first element 21. Further, it is also possible however for the one or more metal layers to be provided in the one or more first partial areas 211 of the first element in a much smaller layer thickness than in the one or more second partial areas 212.

Here, the one or more metallic layers are preferably applied in a layer thickness between 5 nm and 300 nm, further preferably between 10 nm and 100 nm, for example by means of a vapor deposition process, and subsequently completely or largely removed again in the one or more second partial areas 212 by means of a demetallization process. Alternatively, it is also possible to apply a correspondingly structured metal layer in a correspondingly structured manner by using vapor deposition masks such that the one or more metallic layers are substantially or completely present only in the area of the one or more second partial areas 212, but not, or in any case only in a very small layer thickness, in the area of the one or more first partial areas 211.

Instead of or in addition to one or more metallic layers, the first element 21 can also have one or more color layers, in particular dyed with metallic pigments, a thin-film layer system for generating color change effects by means of interference, one or more volume hologram layers and/or liquid crystal layers.

It is further also possible for a relief structure, which in particular generates an optically variable effect, to be molded in one or more of the layers of the first element 21. This can be achieved, for example, by molding a relief structure, for example a diffractive and/or refractive relief structure, or a hologram in the varnish layer 24 by means of thermal replication and/or UV replication, for example register-accurate relative to the one or more second partial areas 212 of the first element 21, and, by subsequently vapor depositing one or more metal layers, producing a corresponding layer of the first element 21, in which a corresponding relief structure, which preferably generates optically variable effects when viewed in reflected light, is molded in the surface of a metallic layer.

Further, for this the first element 21 can also have a preferably transparent varnish layer, in which a corresponding relief structure is molded on the front and/or rear side and which is then further provided on one side or on both sides with a reflective layer.

Analogously, a corresponding relief structure can be molded, for example register-accurate relative to the one or more first partial areas 211, and, in the one or more first partial areas 211 at the boundary surfaces to the varnish layer 24, a transparent varnish layer with a different refractive index can be applied, on the upper side of which the relief structure provided there is then correspondingly molded inversely.

The relief structure in the one or more first partial areas 211 is here preferably designed such that it generates diffractive and/or scattering effects, in particular optically variable effects, when viewed in transmitted light.

Thus, for example, in the embodiment example according to FIG. 1*a*, FIG. 1*b* and FIG. 1*c*, there is provided in the at least one second partial area 212 a full-surface metal layer, in the front side of which diffractive and/or refractive microstructures are molded, which, when viewed in reflected light from the front side, generate as feature 33 the representation of a sailing boat on the water as well as the denomination 45 and the fictitious currency symbol. The feature 33 here preferably represents an optically variable feature, such that, for example, the color and/or the position of the partial motifs of the feature 33, for example the sailing boat, the currency symbol, the denomination and the water, changes when the see-through security element 2 is tilted and/or rotated.

If these relief structures provided in one or more second partial areas 212 are here molded through both in the front and the rear side of the one or more metal layers, a corresponding "mirror-inverted" optically variable impression further also results—as represented schematically in FIG. 1*b*—when viewed from the rear side, such that the feature 34 exhibits a corresponding optical impression.

Further, it is also possible however for two or more reflective layers, in particular opaque metallic layers, in which different relief structures are molded to be provided lying one on top of the other in the one or more second partial areas 212. It is hereby possible to realize optically variable features 33 and 34, which are different when viewed from the front and rear sides, respectively, and become visible when viewed in reflected light. Thus, for example, the feature 34 exhibited when viewed in reflected light from the rear side can exhibit a completely different motif or different partial motif, that is, for example, a completely differently formed sailing boat or a very different motif, for example a portrait or a building or an endless pattern, such as for example a regular arrangement of many representations of the denomination 45.

In this embodiment with at least two or also more opaque reflective layers lying one on top of the other, it is also possible for the one or more first partial areas 221 of the second element 22, which in each case in transmission form a color filter matched to a respectively assigned color, to be provided by a dyed varnish layer, wherein this dyed varnish layer is in part and partially applied overlapping with the second partial areas 212 of the first element 21.

According to a preferred embodiment, a third element, not shown in FIG. 1*d*, which has one or more first transparent partial areas and at least one reflective, in particular highly reflective second partial area, is further also provided underneath the second element 22.

The one or more first transparent partial areas of the third element are here preferably formed like the one or more first transparent partial areas 211 of the first element 21. The at least one reflective second partial area of the third element is preferably formed like the at least one reflective second partial area 212 of the first element 21. With regard to the formation of the third element and its first and second partial areas, reference is thus made to the previous statements relating to the first element 21.

Further, the one or more first transparent partial areas 211 of the first element 21 and the one or more transparent partial areas of the third element are preferably formed congruent with each other, when viewed perpendicular to the plane spanned the first main surface 201. The at least one reflective second partial area 212 of the first element 21 is correspondingly preferably formed congruent with the at least one reflective second partial area of the third element.

The dyed varnish layer of the second element 22 is preferably provided between the two opaque reflective layers of the first element 21 and of the third element lying one on top of the other. As a result, the areas of the dyed varnish layer overlapping with the second partial areas 221 of the first element 22 and/or of the second partial areas of the third element are visible neither in reflected light from the front nor from the rear side nor in transmitted light. The color filter function is only visible in the first areas 211.

Further, it is also possible for another one or more color layers, which influence the color impression of the feature 33 or 34 visible from the front side and/or rear side when viewed in reflected light, to be provided in the one or more second partial areas 212. If a translucent color varnish layer is thus provided, for example on the rear side of a metal layer in the at least one second partial area 212, here the feature 34 exhibited from the rear side when viewed in reflected light can correspondingly be additionally dyed and a corresponding different color impression of the feature 33 and 34 can hereby be achieved.

This can be correspondingly achieved by providing a corresponding translucent color layer in the partial areas 212 on the front side of a metallic layer.

For a communicatability and recognizability that is as simple as possible, the color impressions of the features 33 and 34 recognizable when viewed in reflected light should be as different as possible from the color impressions of the feature 31 recognizable when viewed in transmitted light. In particular, the difference in the color impressions should be chosen such that color-blind people, in particular people with red/green color deficiency or total color-blindness, also perceive the difference. In particular, the color impressions should differ as clearly as possible in lightness and/or in chroma in reflected light and transmitted light.

The one or more layers of the first element 21 are preferably formed such that, when viewed in reflected light from the front and/or rear side, the one or more second partial areas 212 have an optical density of greater than 0.8 OD, preferably of more than 1.1 OD, further preferably an optical density greater than 1.3 OD and in particular preferably of more than 1.5 OD, averaged over the visible wavelength range, and/or have a reflectivity in the visible wavelength range, relative to a pure mirror surface, of more than 40%, further preferably of more than 70%, averaged over the visible wavelength range.

The second element 22 has one or more first partial areas 221, which in each case in transmission form a color filter matched to a respectively assigned color. Further, the second element has at least one second partial area 222. In the at least one second partial area 222, the second element 22 is formed colorless, preferably colorless transparent. This is achieved, for example, because the one or more layers, which in transmission form a color filter and are provided in the one or more first partial areas 221, are not provided or are removed again in the one or more second partial areas 222. Further, it is also possible for a color filter, which is matched to a color which is not assigned to any of the one or more first partial areas 221 of the second element 22, to be formed in transmission and/or reflection in the at least one second partial area 222.

For this, the second element 22 preferably has one or more transparent color layers and/or photochromic layers, which are structured correspondingly to the formation of the one or more first partial areas 221 and second partial areas 222.

The first partial areas 211 of the first element and the first partial areas 221 of the second element 22 at least partially overlap here perpendicular to the xy plane spanned by the first main surface, such that the color impression resulting when viewed in transmitted light can be adjusted by means of the second element 22, preferably without hereby impairing the color impression which is exhibited when viewed in reflected light from the front and/or rear side.

Thus, in the one or more first areas 41 first partial areas 211 of the first element 21 and first partial areas 221 of the second element 22 are preferably arranged register-accurate relative to one another when viewed perpendicular to the plane spanned by the first main surface 201 such that, in transmitted light, in the respective area 41 a first colored feature 31 becomes visible, which is invisible in particular when viewed in reflected light from the front or rear side:

Thus, for example, in the embodiment example according to FIG. 1*c*, a colored lettering "KINEGRAM" is exhibited in a first area 41, for example in red, as first feature 31 when viewed in transmitted light as well as an identically colored schematic sun as first feature 31 in a further first area 41. In transmitted light, these motifs of the features 31 thus appear to the viewer in red in front of an opaque, dark background, for example.

In the embodiment example according to FIG. 1*c*, first partial areas 211 are only provided in the first areas 41 and all of the remaining area of the see-through security element 2 is occupied over the whole surface by a second partial area 212. The see-through security element 2 thus appears, for example, metallic silver both when viewed from the front side and from the rear side, as can also be seen in FIG. 1*a* and FIG. 1*b*, wherein the motifs (sailing boat, water, denomination, currency symbol) are generated by corresponding optically variable relief structures, as explained above. When viewed in transmitted light, the colored features 31 represented in FIG. 1*c* appears to the viewer in the form of the above-described motifs in front of a full-surface dark background.

In the first area 41, as also indicated in FIG. 1*d*, the first partial areas 211 and the first partial areas 221 are here preferably arranged positioned relative to one another such that, when viewed perpendicular to the plane spanned by the first main surface 201, the first partial areas 221 are superposed with a respectively assigned first partial area 211. It is hereby achieved that the color of the one or more first partial areas 221 substantially only displays an optical effect "when viewed in transmitted light", but not "when viewed in reflected light" (both from the front and rear sides). Further, in the first areas 41 the first partial areas 211 and 221 preferably have a dimension of less than 500 μm, preferably less than 300 μm, in particular less than 150 μm, in at least one lateral direction and are preferably thus formed as thin lines or raster elements. It is also hereby achieved that the optical effect of the first partial areas 211 and 221 is substantially only recognizable when viewed in transmitted light and thus the reflected light/transmitted light effect illustrated with reference to figures FIG. 1*a* to FIG. 1*c* is produced.

Further, it is also possible for the see-through security element 2 not to be formed over the whole surface by a second partial area 212 outside the one or more first areas 31, but to have first partial areas 211 there too.

Figure 2:
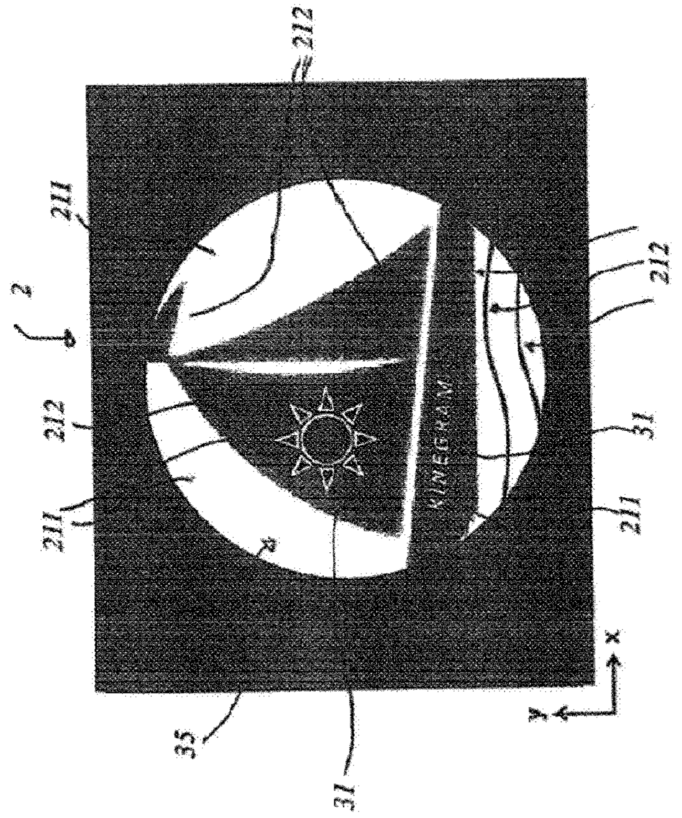
FIG. 2 shows a top view of a see-through security element.

This is shown by way of example in FIG. 2:

FIG. 2 shows the security element 2. As illustrated there, outside the areas 41, in which the colored security features 31 become visible when viewed in transmitted light, first partial areas 211 is also provided, which, when viewed in transmitted light, in particular make colorless, recognizable motifs, here water lines and the stylized outline of a sailing boat for example, visible as further feature 35. This see-through security element 2 thus reveals, for example, a partial metallization designed for viewing in reflection, which in this example are formed as the sailing boat and as water waves. In the sail and in the hull of the boat, further additional security features 31 as already explained above are provided, which only appear as colored security features 31 when viewed in transmitted light.

In this embodiment example it is also possible for relief structures, in particular diffractive and/or refractive microstructures, to be provided in the second partial areas 212 and thus, for example, for a Fresnel-type microstructure, which generates the illusion of a hull jumping out of the plane of the see-through security element 2, to be provided in the second partial area 212 forming the hull of the sailing boat. In the second partial areas 212, which form the sails of the boat, non-achromatically diffracting or reflective microstructures can be provided, which imitate a fluttering of the sails.

Here, it is further advantageous if the see-through security element 2 displays the reflection from the front side and/or rear side in a different color when viewed in reflected light from that when viewed in transmitted light. If, for example, the color red is thus chosen as color for the features 31, the motifs of the features 33 preferably appear shiny silver or in a color other than red.

Figure 3:
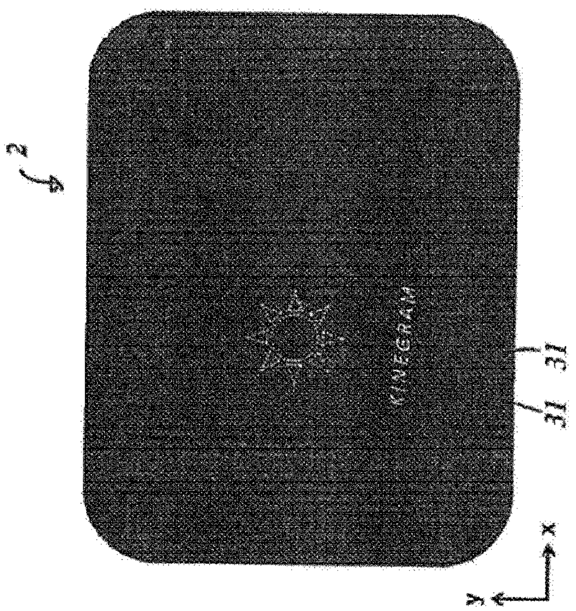
FIG. 3 shows a top view of a see-through security element.

Further, it is preferred if the features 31 have several different colors and/or also has colorless partial areas in addition to "colored partial areas". In FIG. 3, such a formation of the see-through security element 2 is indicated, which generates the lettering "KINEGRAM" in red as first feature 31 and a stylized sun in "blue" (indicated here by dotted lines) as first feature 31 when viewed in transmitted light.

Such effects can be achieved by forming color filters in the one or more first partial areas 221 of the second element 22, which are assigned to the different colors, and providing these correspondingly register-accurate relative to the different colored partial motifs or motifs of the first feature 31 or the first features 31. Further, it is possible here for first partial areas 211 of the first element 21, which do not overlap with assigned first partial areas 221 of the second element 22 but overlap with the at least one second partial area 222 of the second element 22, to be provided in the first areas 41. It is hereby possible for the first features 31 to also have partial areas or partial motifs that appear colorless/white in addition to colored partial areas or partial motifs and thus for the appearance of the one or more first features 31 to be further improved.

Further, it is advantageous, in the first areas 41, for the one or more first partial areas 211 of the first element 21 to be surrounded, in each case at least to the extent of 80% of the surface area, preferably more than 90% of the surface area and in particular completely, by the at least one second partial area 212 of the first element 21 and/or, in the first areas 41, for the one or more first partial areas 221 of the second element 22 to be surrounded, in each case at least to the extent of 80% of the surface area, preferably more than 90% of the surface area and in particular completely, by the at least one second partial area 222 of the second element 22. Tests have thus shown that the blurring of the first features 31 when viewed in reflected light is further improved by such a formation of the first and second partial areas 211, 212, 221, 222.

As already stated above, for this the one or more first partial areas 211, 221 are further preferably formed as lines and/or raster dots, which have a width or diameter of less than 500 μm, preferably less than 300 μm, particularly preferably less than 150 μm.

Further, for this it is advantageous to allow the second partial areas 212 in the first areas 41 to appear as "brilliant" as possible when viewed in reflected light. For this the aim is preferably to achieve as high a reflectivity as possible in the partial areas 212 when viewed in reflected light, if possible to achieve a reflectivity of more than 30%, further preferably more than 50%, further preferably more than 70%.

By reflectivity is here meant, as already stated above, the ratio of the irradiated light in the visible wavelength range to light which is reflected back, diffracted back or backscattered, thus the "total quantity" of the light in the visible wavelength range "returning" in the direction of the viewer when viewed in reflected light.

It has proved particularly effective here to provide the at least one second partial area 212, in particular the first areas 41, with optically active relief structures, in particular with diffractive relief structures generating a rainbow effect and/or diffractive, light-diffracting or reflective achromatic relief structures which generate achromatic movement effects. These movement effects can be arranged or otherwise combined with further, optically variable, effects in the form of a raster. This means that at least one second partial area 212 is subdivided into a plurality of zones, in which in each case a relief structure assigned to one of the effects is molded in a reflective layer which is provided in the at least one second partial area 212.

It has further been shown that a blurring of the first features 31 is further improved when viewed in reflected light by one or more of the first partial areas 211 and the one or more first partial areas 221 in each case having a dimension between 5 μm and 300 μm, preferably between 10 μm and 200 μm, further preferably between 15 μm and 150 μm, in at least one lateral direction.

Figure 8:
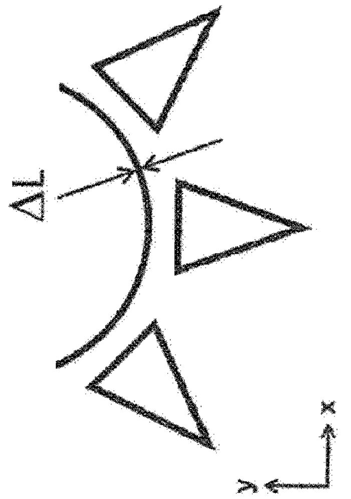
FIG. 8*a* shows a top view of a section of a see-through security element.

As also indicated in FIG. 8, the one or more first partial areas 211 and 221 are preferably formed as a fine, continuous line.

The width ΔL of at least 70%, further preferably at least 90% of the first partial areas 211 and 221 in the area 41 is preferably smaller than 300 μm.

The line width ΔL in the first area 41 is preferably between 5 μm and 300 μm, further preferably between 10 μm and 200 μm, further preferably between 15 μm and 150 μm.

Further, it is also possible here, in such a design of the one or more first areas 211 and 221 in the form of fine lines, that these lines can also be substructured, for example formed as dashes or dots, which are then "grouped" to form corresponding lines, which ultimately form visible first features 31 when viewed in transmitted light.

In addition to such a formation of the one or more first partial areas 211 and/or 221 as lines, it is also advantageous to form the first partial areas 211 and 221 as raster dots, which are arranged according to a one- or two-dimensional raster in the respective first area 41. Here, the individual raster dots can have any desired shape, for example circular-disk shaped, square, rectangular in top view, but can also be a complex structure, such as for example an alphanumeric character. Here, the raster dots preferably have width dimensions between 5 μm and 300 μm, preferably between 10 μm and 200 μm, further preferably between 15 μm and 150 μm, in one, further preferably in both lateral directions. In the simplest case, in the design of a raster dot as a "circular disk", the diameter of this circular disk, when viewed perpendicular to the plane spanned by the first main surface 201, is thus between 5 μm and 300 μm, preferably between 10 μm and 200 μm, further preferably between 15 μm and 150 μm.

A colored first feature 31 with a "planar" effect when viewed in transmitted light can be provided through such a design. The individual "raster dots" are here arranged in the raster such that the human viewer perceives as far as possible an "integral" effect, and a perceptible "surface profile" appears to the viewer which is preferably bordered by the outline of the area in which the raster dots are provided according to the raster, and the lightness of which is determined by the respective local spacing and size of the raster dots.

The spacing of the raster dots of the raster and/or of the period of the raster is preferably in the range between 5 μm and 300 μm, preferably between 10 μm and 200 μm, further preferably between 15 μm and 150 μm.

It is further advantageous if the at least one second partial area 212 of the first element 21 completely surrounds the one or more first partial areas 211 of the first area 41, and further also completely surrounds the respective first area 41 of the see-through security element 2, when viewed perpendicular to the plane spanned by the first main surface 201.

Figure 9:
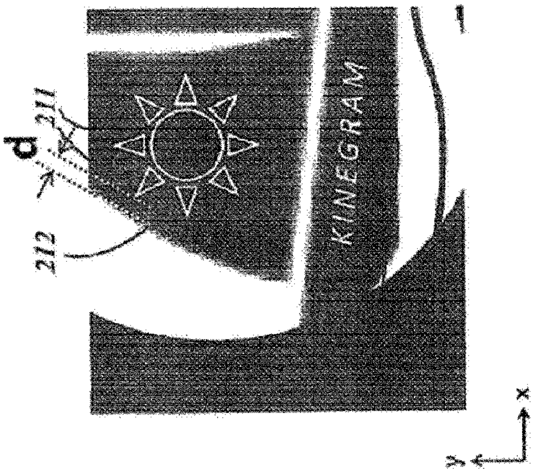
FIG. 9 shows a top view of a section of a see-through security element.

It is further advantageous here for the first partial areas 211 provided in the first area 41 to be surrounded by the at least one second partial area 212 in all lateral directions at least at a distance d. This is illustrated, for example, in FIG. 9: there, the second partial area 212 thus still extends, starting from the respective first partial areas 211, by at least the distance d.

Here, the distance d is preferably chosen greater than 0.5 mm, further preferably greater than 0.8 mm, and further preferably greater than 1 mm.

It is further advantageous for the at least one second partial area 212, starting from the first area 41, to still extend by at least the distance d, when viewed perpendicular to the plane spanned by the first main surface.

Figure 10:
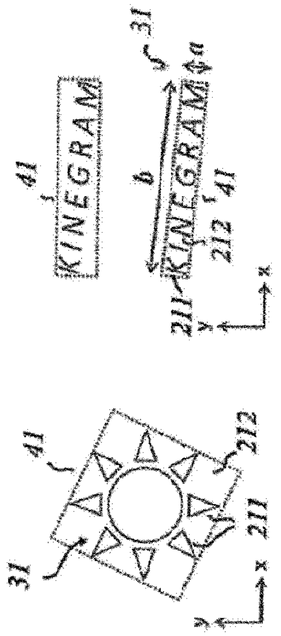
FIG. 10 shows several top views of respective sections of a see-through security element.

If, as illustrated for example in FIG. 10, the first area 41 of the see-through security element is thus formed by the smallest possible rectangular area in which every edge of the rectangular area adjoins the first feature 31 in each case, when viewed perpendicular to the plane spanned by the first main surface 201, then the second partial area 212 completely surrounds this "rectangle" in one strip, which has a width d.

As also illustrated in FIG. 10, the outline contours of the first feature 31 are here defined by the lateral arrangement of the first partial areas 211. This applies in a corresponding manner if the first partial areas 211 are formed as raster dots. As illustrated in FIG. 10, in this definition of the first area 41 there results for the first feature 31, which is formed as the sequence of letters "KINGEGRAM", the shape of the area 41, presented in the lower representation according to FIG. 10, as a rectangle with a length b and a width a.

As also illustrated in FIG. 10, here the rectangle can also be "rotated" if a smaller surface area can thereby be achieved. Thus, in the case of FIG. 10, as the corresponding smallest rectangle, the rectangle arranged at the bottom, matched in an inclined manner with the lettering, forms the basis of the definition of the area 41 as smallest rectangle.

Tests have shown that, with such a design, for one thing the recognizability of the first feature 31 is further improved and further the "blurring" of the first feature 31 when viewed in reflected light is also further improved. Because the first partial areas 211 are surrounded by a second partial area 212 with a correspondingly large margin, the optical contrast is increased for the viewer of the see-through security element 2 in transmitted light and thus the secure checking of the properties by the viewer is simplified.

It has further proved advantageous if the surface proportion F of the first partial areas 211 provided in the first area 41 relative to the total surface area of the area 41 is smaller than 20%, further preferably smaller than 10%, further preferably smaller than 5%.

The first area on which this calculation is based is here preferably defined as explained above with reference to FIG. 10, i.e. defined by the smallest possible rectangle surrounding the first partial areas 211 which form the first feature 31. The surface proportion F is thus determined from the total sum of the first partial areas 211 in the area 41 relative to the total sum of the first partial areas 211 and the second partial areas 212 in the area 41.

A preferred embodiment provides that the see-through security element has a first element 21, which has one or more transparent first partial areas 211 and at least one reflective second partial area 212, and has a second element 22, which has one or more first partial areas 221, which in each case in transmission form a color filter matched to a respectively assigned color, and has at least one second partial area 222, which is formed colorless, in particular colorless transparent, or in transmission and/or reflection forms a color filter which is matched to a color which is not assigned to any of the one or more first partial areas 221 of the second element 22, wherein the first partial areas 211 of the first element 21 and the first partial areas 221 of the second element 22 at least partially overlap when viewed perpendicular to the plane spanned by the first main surface.

The transparent first partial areas 211 produce, together with the reflective second partial areas 212, a gray-scale image which is recognizable metallic silver when viewed in reflected light from the front side and from the rear side. The colored first partial areas 221 of the second element 22 are recognizable monochromatic or multicolored when viewed in transmitted light.

Figure 16:
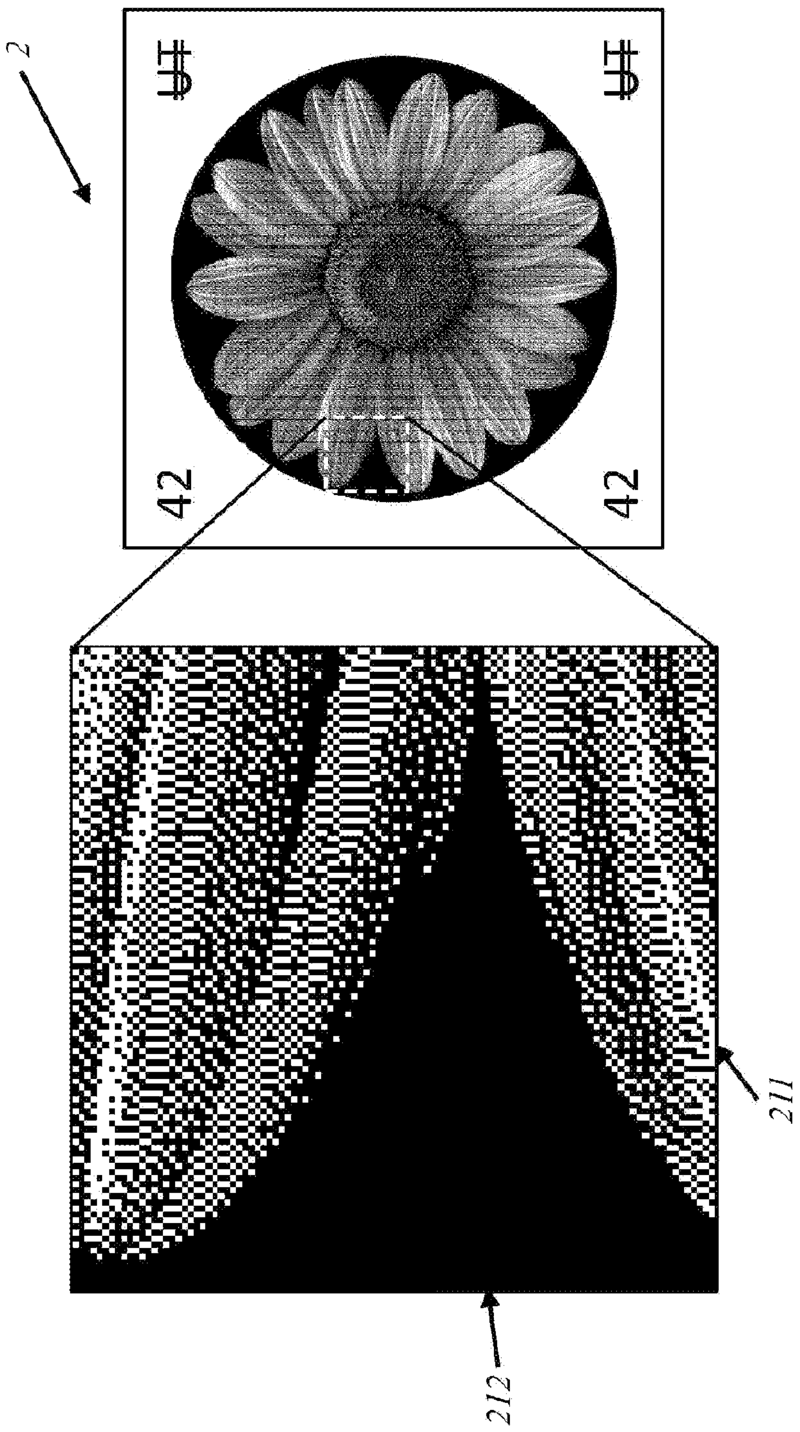
FIG. 16 shows a top view of a see-through security element and a section of this see-through security element.
Figure 18A:
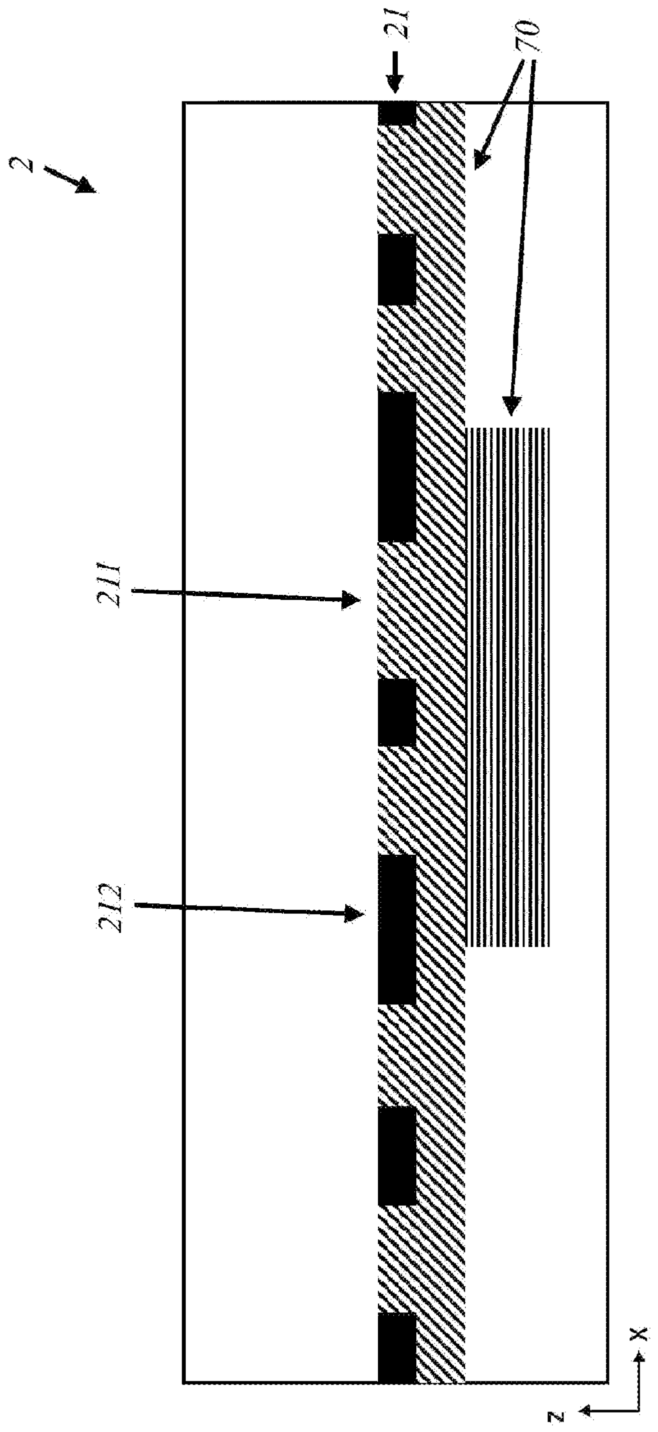
FIG. 18*a* and FIG. 18*b* each show sectional representations to illustrate a method for producing a see-through security element.
Figure 18B:
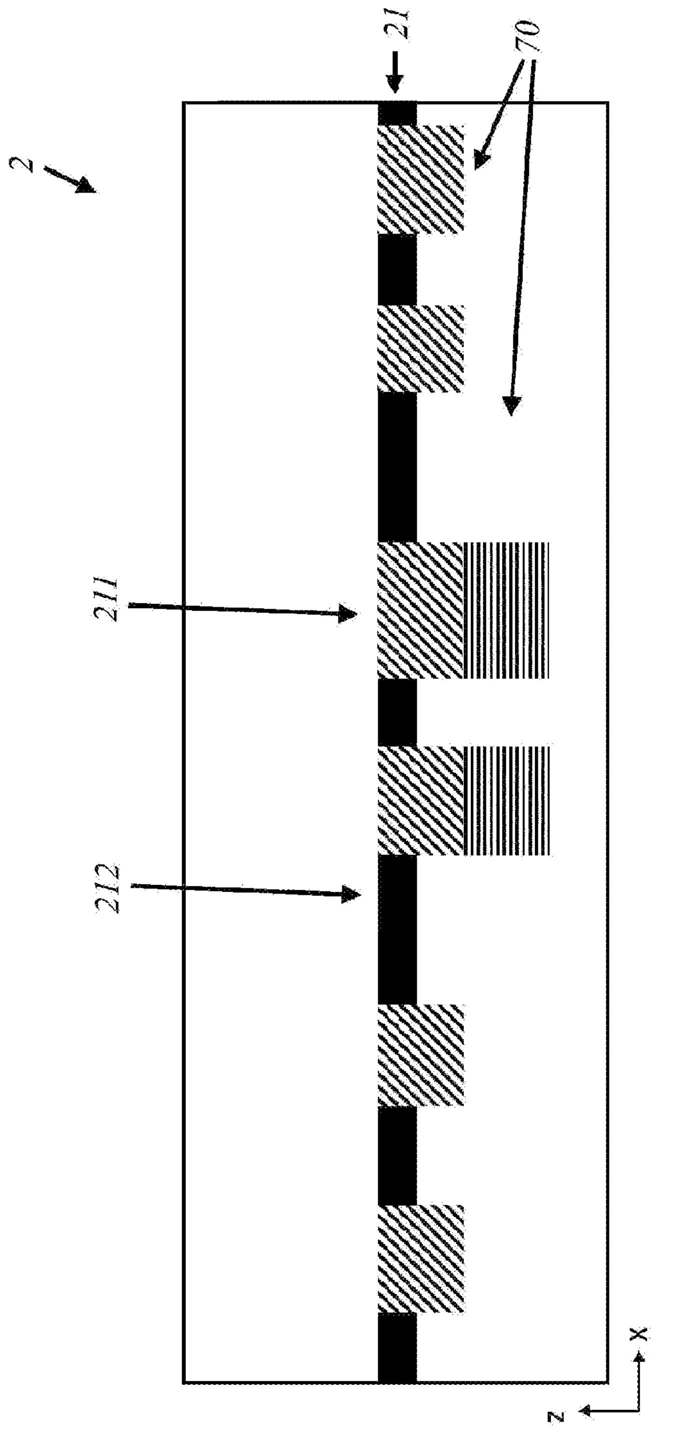

FIG. 16 shows this by way of example with reference to a flower motif. The enlarged section shows the rasterization to produce the gray-scale image. The reflective second partial areas 212 are here represented by dark areas, the transparent first partial areas 211 are represented by light areas. The color layer 221 structured by means of the negative photoresist in register with the reflective second partial areas 212 is present in the transparent first partial areas 211. Two or more differently dyed photoresists can optionally also be used overlapping the partial areas 211, e.g. a yellow dyed photoresist in the area of the whole flower and additionally a red dyed photoresist in the round center (pistil) of the flower on the yellow dyed photoresist (see FIG. 18*a* and FIG. 18*b*). As both dyed photoresists can be transparent or semi-transparent photoresists, a mixed color consisting of yellow and red forms, when viewed in transmitted light, in the partial areas 211 in the round center (pistil) of the flower. The petals of the flower appear yellow in the partial areas 211 when viewed in transmitted light. As a result, the flower appears two-colored in the partial areas 211 when viewed in transmitted light. Alternatively, the two or more photoresists can also be applied such that they do not overlap or do so only in partial areas. Differently colored photoresists are arranged in different partial areas 211. A reflective, opaque frame consisting of the partial areas 212 around the flower can be used to absorb any printing tolerances in the case of the partial application of the negative photoresist.

So that the color in the transparent first partial areas 211 is invisible or as invisible as possible when viewed in reflected light, the transparent first partial areas 211 preferably comprise less than 30% surface proportion of the first element 21, further preferably less than 20% surface proportion of the first element 21 and in particular preferably less than 10% surface proportion of the first element 21, in at least 50% of the surface area of the gray-scale image. Further preferably, the transparent first partial areas 211 comprise less than 30% surface proportion of the first element 21, further preferably less than 20% surface proportion of the first element 21 and in particular preferably less than 10% surface proportion of the first element 21, in at least 70% of the surface area of the gray-scale image.

Brilliant optically variable effects, in particular movement effects, are further preferably present in the area of the gray-scale image of the first element 21 in the partial areas 212. Here, diffractive grating structures with a number of lines of 500 lines/mm to 2000 lines/mm and further preferably 600 lines/mm to 1500 lines/mm and/or refractively acting micromirrors and/or refractively acting structures, with predominantly achromatic optical effects, can preferably be used. Such brilliant effects conceal the color in the partial areas 211, which is present in register relative to the metallization in the partial areas 212, particularly well.

The possibility of avoiding abrupt lightness transitions is particularly advantageous in embodiments by means of gray-scale images. The recognition of lightness transitions is thereby made more difficult when viewed in reflected light, whereas when viewed in transmitted light the image information still remains easily recognizable.

Further, it is also possible for one or more first partial areas 221 of the second element 22 also to be provided outside the first areas 41. This is shown by way of example in FIG. 4*a* and FIG. 4*b:*

Figure 4A:
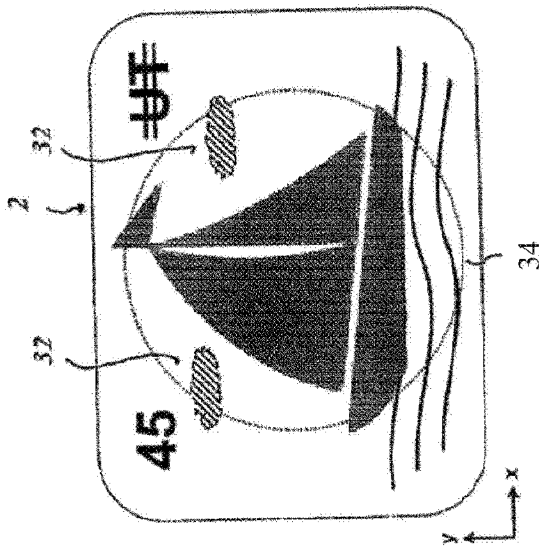
FIG. 4*a* and FIG. 4*b* each show a top view of a see-through security element.
Figure 4B:
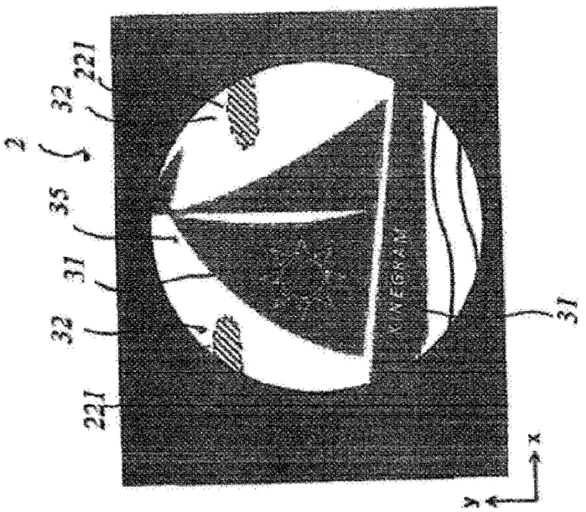

FIG. 4*a* shows such a see-through security element 2 when viewed in reflected light from the front side and FIG. 4*b* shows it when viewed in transmitted light.

In this embodiment example, the feature 31 already explained above is visible when viewed in transmitted light and the features 33 and 34 already explained above are visible when viewed in reflected light. Further, colored features 32, which in each case are formed as part of a "cloud", are also visible when viewed in transmitted light. These features 32 are here formed by correspondingly shaped first partial areas 221 of the second element 22, which are arranged correspondingly overlapping inside an extensive first partial area 211 of the first element 21. These first colored features 32 are preferably here also visible when viewed in reflected light, as indicated in FIG. 4*a*.

Figure 5B:
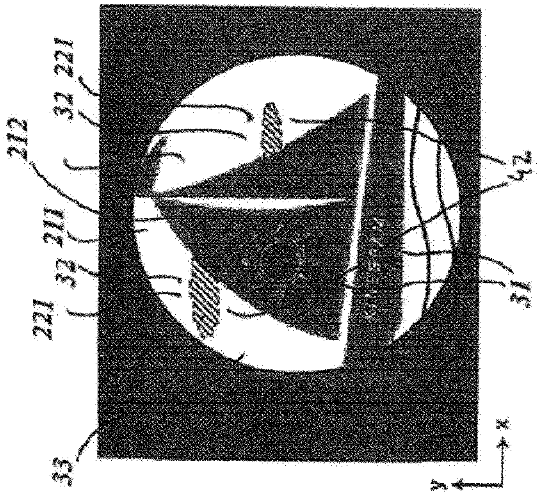
FIG. 5*a* to FIG. 5*d* each show a top view of a see-through security element.
Figure 5A:
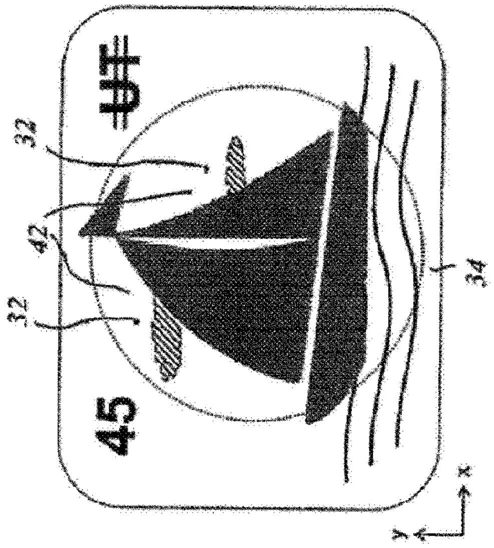

Here, the first partial areas 221, which form the features 32, are preferably arranged register-accurate relative to a first partial area 211 of the first element such that the colored features 32 directly adjoin a third feature visible when viewed in reflected light from the front side and the rear side and thus—as represented in FIGS. 5*a* and 5*b*—for example directly adjoin the feature 33 and in particular its partial "sail" motifs.

The security element 2 thus preferably has one or more second areas 42 in which, as illustrated in FIG. 1*d*, at least one of the first partial areas 221 of the second element directly adjoins a second partial area 212 in areas, when viewed perpendicular to the plane spanned by the first main surface 201. Thus, in each case the partial area 221 formed as a "cloud" for example overlap with a first partial area 211 of the first element, which is formed for example as the "negative form" of the sailing boat, such that this partial area 221 directly adjoins a second partial area 212 adjoining this first partial area 211 in areas. This is because, for example, the right-hand edge of the "cloud" or the left-hand edge of the "cloud", as illustrated in FIG. 5*a* and FIG. 5*b*, directly adjoins the second partial area 212, which is formed as a "sail".

Here, as also shown in FIG. 5*b*, the respectively overlapping first and second partial areas 211 and 221 preferably have a different design here or form different motifs, in particular form complementary motifs.

It is further possible here not only for a first partial area 221, but also for two or more such partial areas, which in each case in particular form color filters which are matched to different colors, to be provided inside a first partial area 211.

This is illustrated below with reference to FIG. 5*c* and FIG. 5*d:*

Figure 5C:
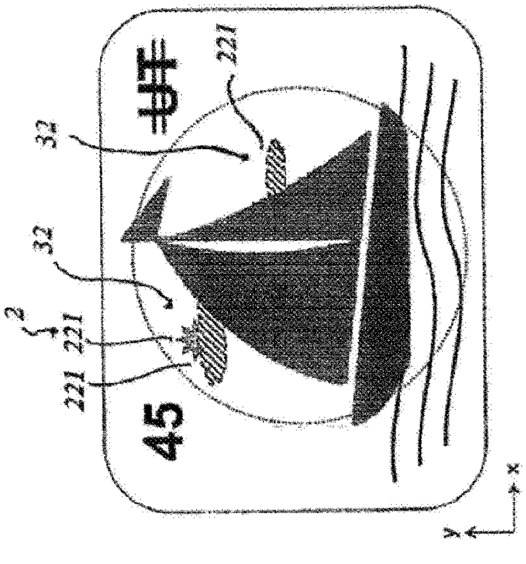
Figure 5D:
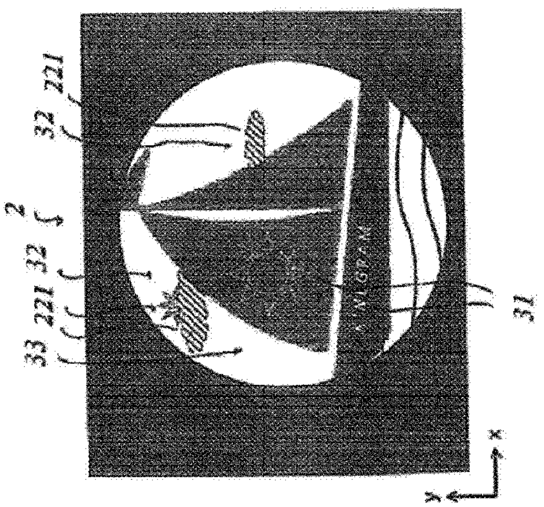

FIG. 5*c* shows a view of a see-through security element 2 when viewed in reflected light from the front side and FIG. 5*d* shows this see-through security element 2 when viewed in transmitted light. As indicated in figures FIG. 5*c* and FIG. 5*d*, the feature 32 is here formed by a first partial area 221, which is formed as a cloud and appears in the color "blue" when viewed in transmitted light, and a first partial area 221 arranged register-accurate relative thereto, which is formed as half a "sun", which appears in the color "yellow" when viewed in transmitted light.

Because the two first partial areas 221 are joined to each other directly, it is achieved that no mixed colors, which would significantly impair the viewing impression, form in the overlapping area. This perfect register accuracy between the two colors without a mixed color in the border area between the two colors represents a very high hurdle for forgers, which further increases the protection against forgery. A mixed color would form in the border area when colors overlap there and thus there is precisely no perfect register accuracy.

Figure 6B:
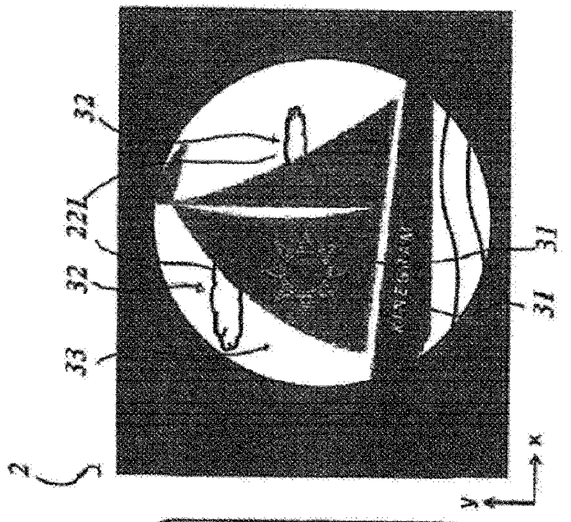
FIG. 6*a* and FIG. 6*b* each show a top view of a see-through security element.
Figure 6A:
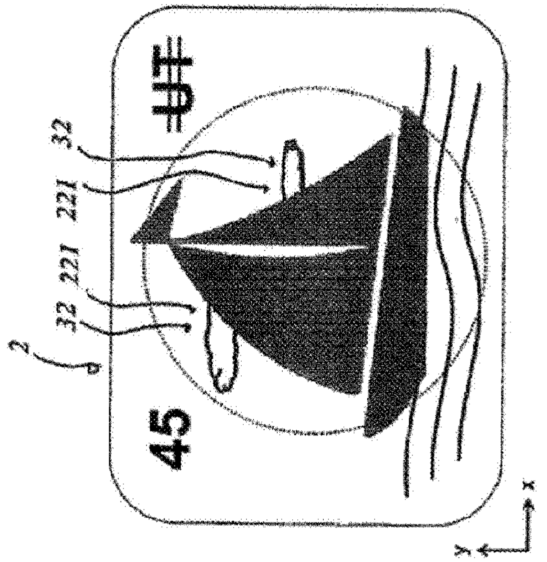

FIGS. 6*a* and 6*b* illustrate a see-through security element 2 in which the first partial areas 221, which form the features 32, are shaped as lines and which, as already explained with reference to FIGS. 4*a* to 5*b*, adjoin a second area 212 register-accurately. These lines are here shaped as a stylized cloud.

FIG. 6*a* here illustrates a top view of the security element 2 when viewed in reflected light from the front side, and FIG. 6*b* when it is viewed in transmitted light. The features 32 appear in blue here when viewed in transmitted light.

Figure 7B:
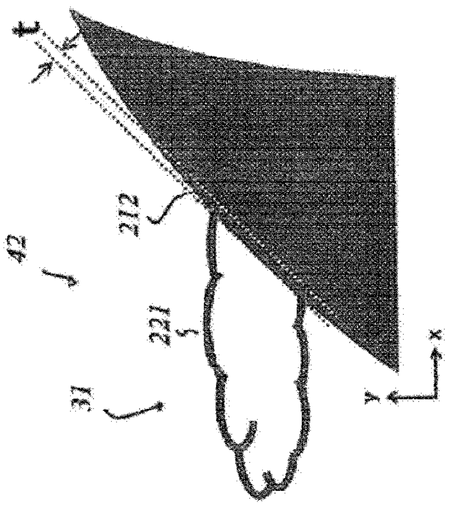
FIG. 7*a* and FIG. 7*b* each show a top view of a section of a see-through security element.
Figure 7A:
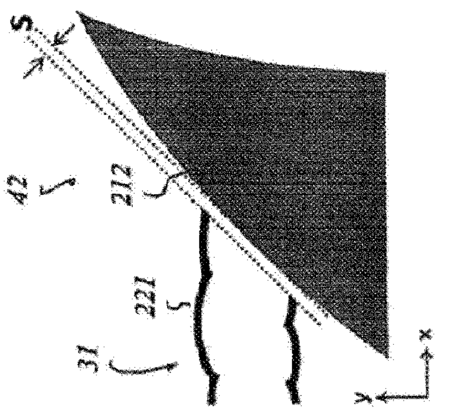

Here, it is further also possible for the first partial areas 221 not only to adjoin the second partial area 212 seamlessly but, as shown in FIG. 7*a*, for a gap with a width s to be provided between the first partial area 221 and the second partial area 212. The width of the gap s is preferably less than 500 μm, preferably less than 300 μm, further preferably less than 150 μm and in particular less than 50 μm. It is thus ensured that, for one thing, no overlapping and no influencing of the optical effect of the second partial area 212 takes place when viewed in reflected light, for another the register accuracy of the two elements can still be assessed very well by the human viewer, and correspondingly a forgery can be easily checked.

Further, it is also possible for the first partial area 221 and the second partial area 212 in each case to have an overlap t of not more than 100 μm, preferably not more than 50 μm, further preferably not more than 10 μm. This is illustrated in FIG. 7*b*.

Tests have shown that corresponding optical alterations of the second partial area 212 cannot yet or can hardly be perceived with such a small overlap when viewed in reflected light.

A further preferred embodiment provides in particular that a security document, preferably the security document 1 according to FIG. 1, has two or more see-through security elements.

Here, a first see-through security element preferably has a first element 21 and a second element 22. Here, a second see-through security element preferably has a first element 21 and a second element 22.

If the first see-through security element has a first element 21 and a second element 22, then the second see-through security element can only have a first element 21.

If the second see-through security element has a first element 21 and a second element 22, then the first see-through security element can only have a first element 21.

However, it can also be provided that the first see-through security element has a first element 21 and a second element 22 and the second see-through security element has a first element 21 and a second element 22.

The first see-through security element has a first element 21, which has one or more transparent first partial areas 211 and one or more reflective second partial areas 212, wherein the first see-through security element has a second element 22, which has one or more first partial areas 221, which in each case in transmission form a color filter matched to a respectively assigned color, and have one or more second partial areas 222, which are formed colorless, in particular colorless transparent, or in transmission and/or reflection form a color filter which is matched to a color which is not assigned to any of the one or more first partial areas 221 of the second element 22, wherein the first partial areas 211 of the first element 21 and the first partial areas 221 of the second element 22 at least partially overlap when viewed perpendicular to the plane spanned by the first main surface.

The second see-through security element has a first element 21, which has one or more transparent first partial areas 211 and one or more reflective second partial areas 212, wherein the second see-through security element has a second element 22, which has one or more first partial areas 221, which in each case in transmission form a color filter matched to a respectively assigned color, and have one or more second partial areas 222, which are formed colorless, in particular colorless transparent, or in transmission and/or reflection form a color filter which is matched to a color which is not assigned to any of the one or more first partial areas 221 of the second element 22, wherein the first partial areas 211 of the first element 21 and the first partial areas 221 of the second element 22 at least partially overlap when viewed perpendicular to the plane spanned by the first main surface.

Figure 17A:
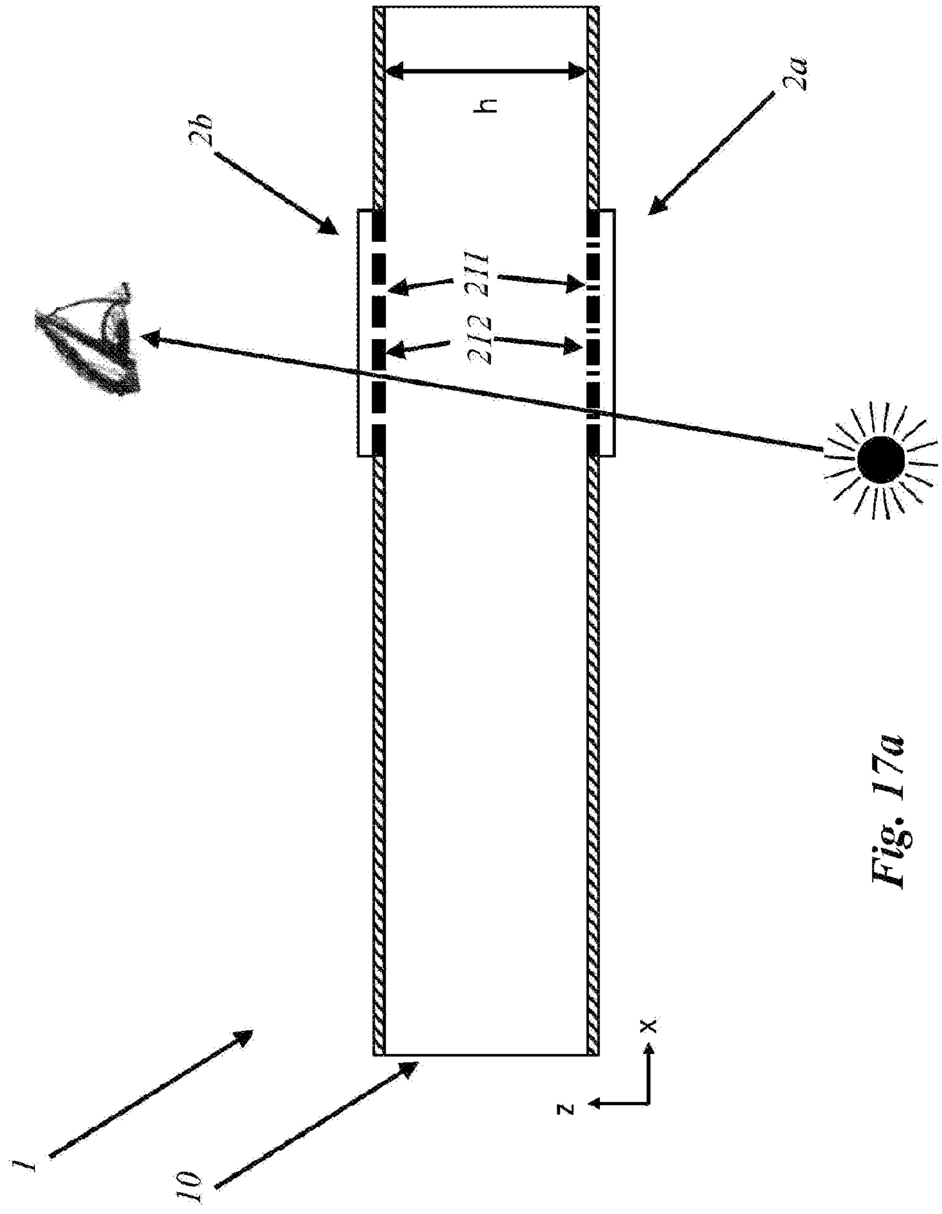
FIG. 17*a* shows a sectional representation of a security document with two see-through security elements.

FIG. 17*a* shows, in a schematic sectional representation, the first and the second see-through security elements 2*a*, 2*b*, which are arranged in a transparent area, in particular transparent window area, on opposite sides of a substrate 10 of a security document, in particular a banknote made of a polymer substrate, and spaced apart from each other at a distance h. The first see-through security element 2*a* acts here as luminescent layer and the second see-through security element 2*b* acts as mask layer.

Preferably, the first element 21 and the second element 22 are arranged in the second see-through security element 2*b* and only the first element 21 is arranged in the first see-through security element.

The first element 21 of the first see-through security element 2*a* therefore has first partial areas 211 and second partial areas 212, which are arranged in the form of a Moiré item of information. For this, the second element 22 of the first see-through security element 2*a*, thus a structured color layer, is arranged in register.

The first element of the second see-through security element 2*b* therefore also has first partial areas 211 and second partial areas 212, wherein the first partial areas 211 produce transparent openings and the second partial areas 212 produce opaque (reflective) areas. For this, the first partial areas 221 and second partial areas 222 of the second element, thus a structured color layer in the first partial areas 221, are arranged in register.

The structured color layer is preferably arranged in only one see-through security element, preferably in the second see-through security element 2*b* (mask layer).

The second see-through security element 2*b* is shown in FIG. 17*a*, viewed in transmitted light from the visible face. The light strikes the first see-through security element 2*a*, thus the luminescent layer—e.g. a protective layer of a security element—and transmits the light to the second elements 22, for example in the form of a structured color layer, and to the first elements 21 in the form of the Moiré information. The light penetrates the substrate 10 and the second see-through security element 2*b* (mask layer) through the transparent openings and here produces the desired effect, e.g. Moiré magnifications and/or movement effects.

Figure 17B:
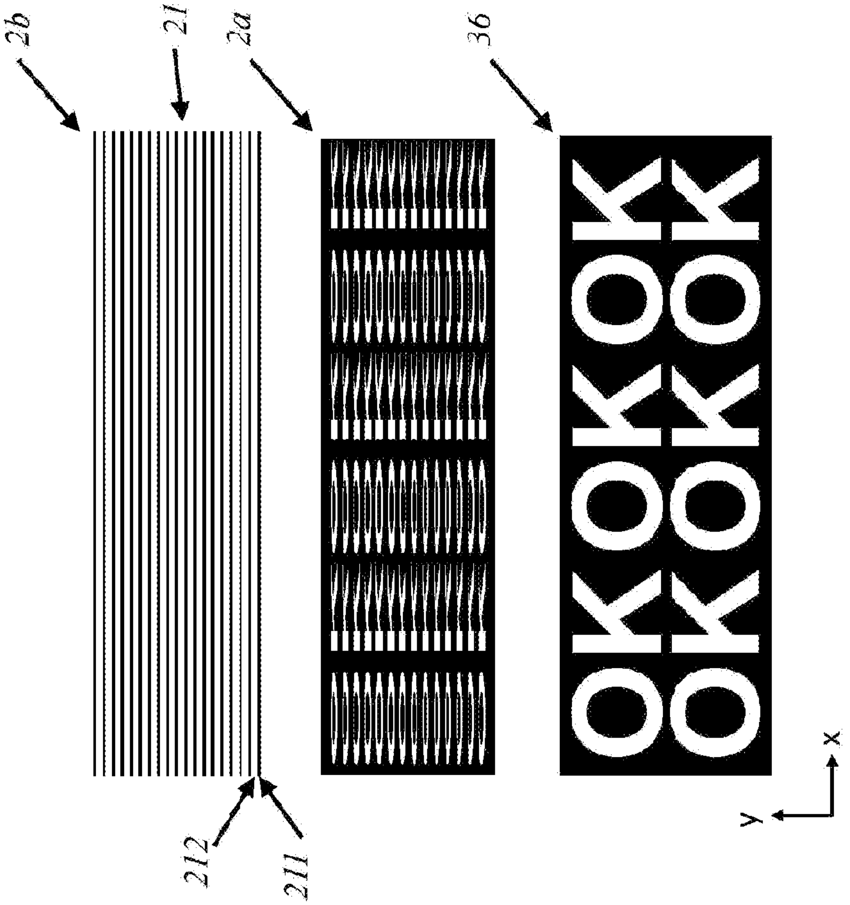
FIG. 17*b* shows schematic top views of see-through security elements and an item of image information.

FIG. 17*b* shows the second see-through security element 2*b* (mask layer), the first see-through security element 2*a* (luminescent layer) and the visible image information 36 in a schematic top view.

In the present example, the second see-through security element 2*b* (mask layer) is formed as a line raster, with the first elements in the form of a line raster and the second elements in the form of a structured color layer. In the present example, the first see-through security element 2*a* (luminescent layer) has first elements in the form of the Moiré information. The image information 36, visible in the present example when viewed in transmitted light, corresponds to the letter combination “OK”.

In the second see-through security element 2*b* (mask layer), instead of the line raster, a dot raster is also possible.

The Moiré information in the first see-through security element can be shaped, for example, as a microimage raster, wherein the microimages, which are made visible to the human viewer as large images through the so-called Moiré magnification effect, are arranged according to a periodic raster. If the banknote is now tilted when viewed in transmitted light, or the viewing angle is otherwise changed, the visible large images seem to move.

Figure 17C:
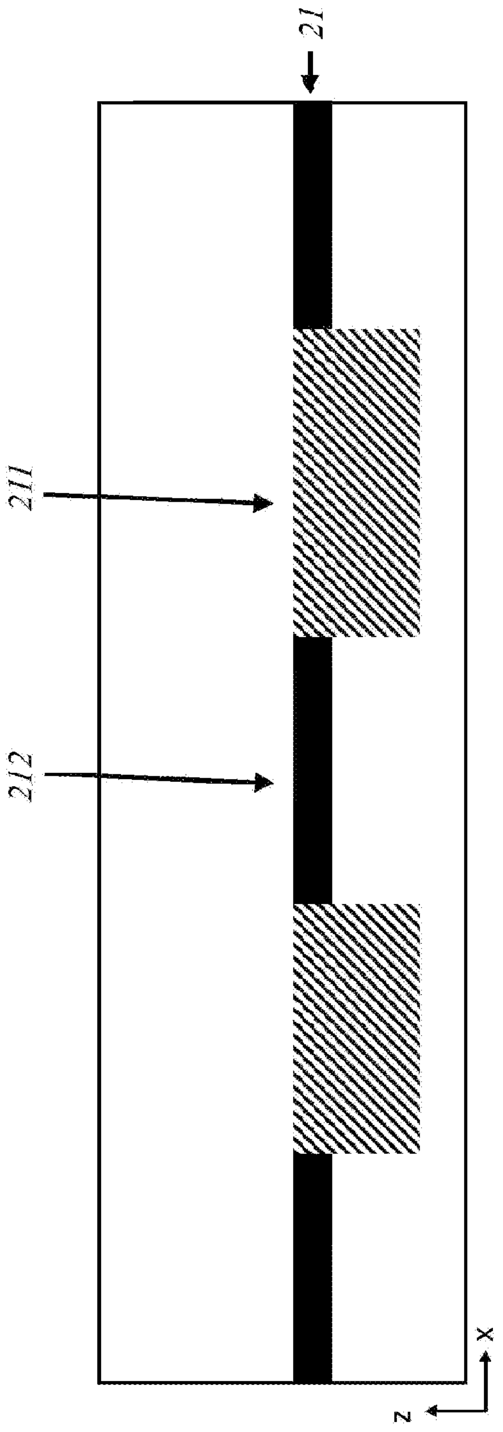
FIG. 17*c* shows a sectional representation to illustrate a method for producing a see-through security element.

Preferably, one of the two see-through security elements 2*a*, 2*b*, or both, has the (colored) first partial areas 221 of the second element 22 in register with the (reflective) second partial areas 212 of the first element 21, as represented schematically in FIG. 17*c*. As a result of this, the movement effect appears monochromatic or multicolored in transmitted light.

Possible methods for producing a see-through security element, and in particular the see-through security elements 2, 2*a*, 2*b* according to the preceding embodiment examples, are now illustrated below with reference to FIGS. 11*a* to 15*i*:

First of all, as already described above, a substrate is produced, which comprises the carrier layer 23 and the one or more varnish layers 24 optionally applied thereto.

Figure 11A:
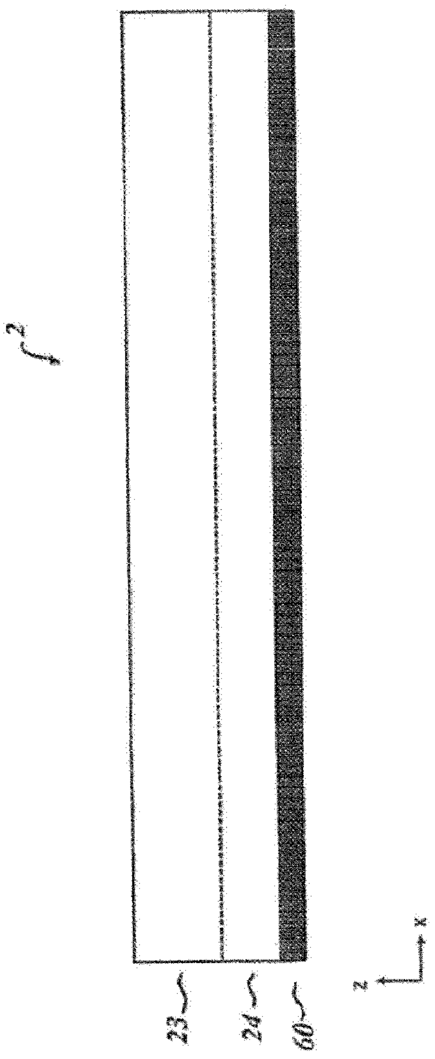
FIG. 11*a* to FIG. 11*f* each show sectional representations to illustrate a method for producing a see-through security element.

First of all, an opaque metal layer 60 is deposited over the whole surface of this substrate, which preferably has a replication layer, in which microstructures are molded by means of thermal replication and/or UV replication, as varnish layer 24. FIG. 11*a* shows such a substrate. The metal layer 60 can consist of aluminum, silver, chromium or copper, for example. This can be realized by means of thermal vaporization in a vacuum, for example.

Further, in addition to the layer 60, it is also possible to apply one or more further ones of the layers described above, which can be provided to form the first element 21.

Figure 11B:
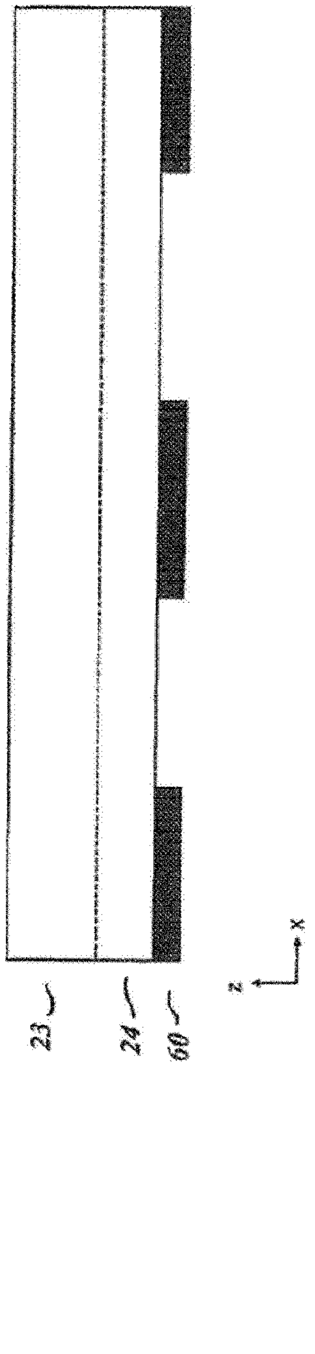

Then the layer 60 is partially removed, as shown in FIG. 11*b*. This can be effected by means of printing on an etch resist and then etching, or by means of a washing process, for example. If a washing process is used, before the layer 60 is applied, a washing varnish is printed on in corresponding areas, which is then dissolved or removed in a washing process, together with the areas of the layer 60 lying on top of it, after the layer 60 has been applied.

This process can furthermore also be repeated multiple times with the application of further layers. Further, it is also possible to apply another one or more of the layers mentioned further above for the first elements 21, partially and patterned, in particular in register with the layer 60.

Figure 11C:
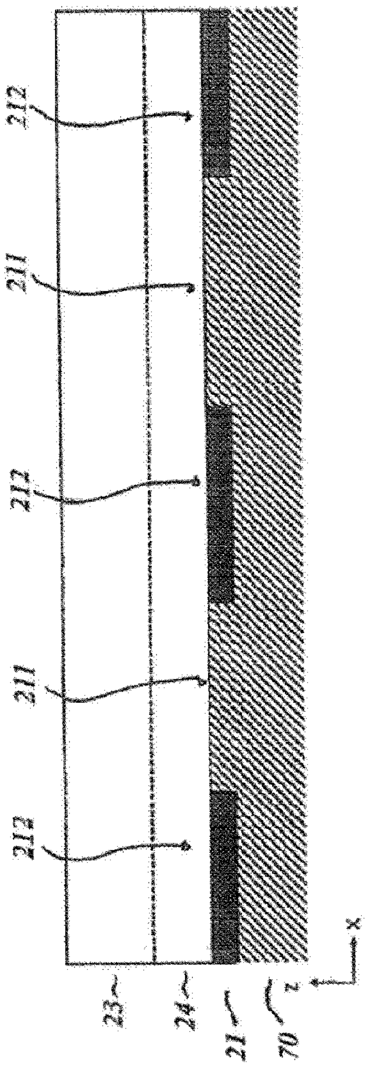

After the first element 21 has been produced by carrying out such processes, a photoresist layer 70 made of a negative photoresist is applied over the whole surface, as illustrated in FIG. 11*c*.

As already explained above, the first element 21 consists here of the one or more first partial areas 211 and the one or more second partial areas 212. As illustrated in the embodiment example represented in FIG. 11*c*, the one or more layers of the first element 21 are here provided in the partial areas 212, but are not provided in the partial areas 211. In the simplest case, the first element 21 thus consists of the metal layer 60, which is provided in the partial areas 212 after carrying out the structuring process, but is not provided in the partial areas 211.

Here, the photoresist is preferably a negative photoresist, which is correspondingly dyed in order to provide in transmission a color filter which is matched to a predefined color, for example "blue".

A negative photoresist is characterized by the fact that this varnish cures with sufficient exposure to light with a suitable wavelength, e.g. by means of UV radiation, and thereby becomes insoluble in a particular solvent, e.g. acidic or basic aqueous solutions, in the exposed areas. Consequently, dyed areas with a defined shape and size can be achieved through a masked exposure to light.

Low-molecular-weight organic compounds which have more than one epoxy group per molecule are generally the main constituent of a negative photoresist based on epoxy resins.

Epoxy resins based on bisphenol A, epoxidized phenol novolac, resorcinol glycidyl ether and cycloaliphatically constructed resins are preferably used as resin component for the production of photoresist.

In combination with a crosslinker (hardener), the so-called resin/hardener system produces a macromolecular network through polymerization of the epoxy group. Various hardeners, which differ in the ring-opening reaction of the oxirane groups, can be used here. Acid anhydrides, amines or phenol-containing compounds are preferably used, or triarylsulfonium salts are used as photoactive component.

Furthermore, catalysts, such as e.g. Lewis bases and acids, are preferably used. The hardener is incorporated into the three-dimensional network structure. In the case of a basic accelerator, the catalyst promotes the network formation via ester bridges.

g-Butyrolactone is preferably used as solvent in the printing ink of such epoxy-resin-based photoresists.

Further, additives, such as e.g. long-chain epoxy resins, are preferably used, for one thing, to act as adhesion promoter, reactive diluent or to increase or decrease the viscosity.

For example, the SU-8 epoxy novolac photoresist based on bisphenol A; triarylsulfonium hexafluoroantimonate; g-butyrolactone (sold, for example, by MicroChem. Corporation) is used as negative photoresist. This photoresist is dyed with Orasol dye or Microlith color pigments.

Water-based negative photoresists can be dyed with Luconyl, for example.

The photoresist layer 70 is applied to the first element 21 over the whole surface, for example, by means of gravure printing, as illustrated in FIG. 11*c*.

Further, it is also possible for another one or more further layers to be provided between the first element 21 and the photoresist layer 70. However, the total thickness of such layers is preferably not more than 15 μm, further preferably not more than 5 μm.

Tests have shown that a corresponding good register accuracy can no longer be achieved when the thicknesses are exceeded and furthermore negative optical effects also come into effect.

These intermediate layers can, for example, be additional varnish layers in particular for protecting the metal layer 60 in further process steps, an adhesion-promoting layer for improving the bonding of the photoresist, replication layers, a full-surface or partial HRI layer, an SiOx layer or a further photopatternable layer, which is not dyed however.

Figure 11D:
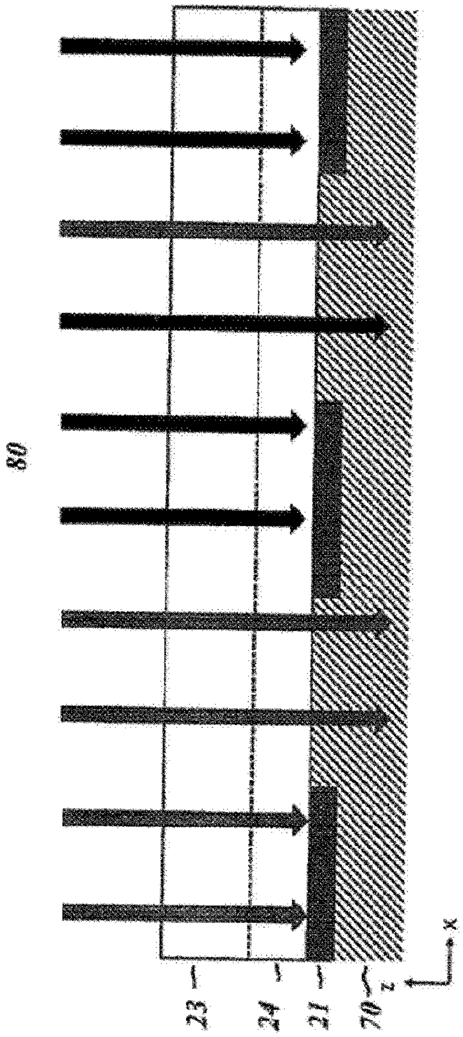

As illustrated in FIG. 11*d*, the photoresist layer 70 is then exposed to light with a suitable wavelength through the first element 21, for example by means of UV radiation 80. Here, the partial metal layer 60 in particular acts as mask for the exposure to light.

Figure 11E:
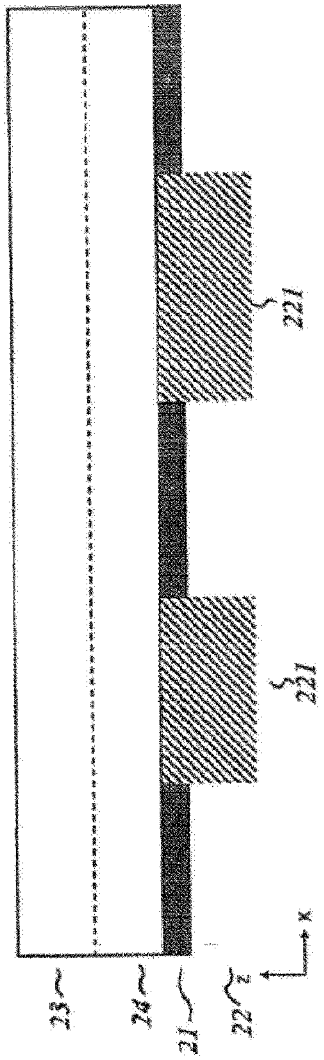
Figure 11F:
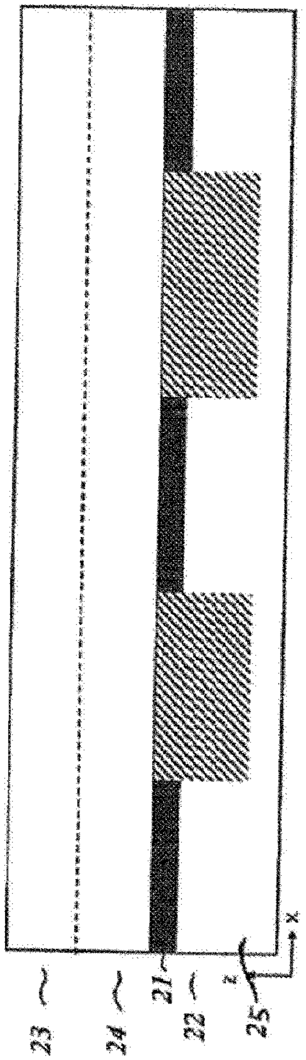

As the photoresist is a negative photoresist, only the exposed parts of the photoresist layer 70 remain in a washing process carried out after the exposure to light, as shown in FIG. 11*e*. Due to their property, the partial areas of the photoresist layer 70 thus remaining form first partial areas 221 of a second element 22, which are formed in perfect register with the first partial areas 211 in the see-through security element 2. An adhesive and/or adhesion-promoting layer and/or protective layer is optionally then applied. In FIG. 11*f* it is here shown that the adhesive layer 25 is applied over the whole surface in a further step, for example by means of gravure printing.

Further, it is also possible not to apply the photoresist layer 70 over the whole surface, but in areas. It is hereby possible to absorb tolerances in the case of the partial photoresist layer applied, for example, by means of gravure printing, and to form further areas in which a first partial area 211 is not, or is only over part of the surface, overlapped by a first partial area 221.

Figure 12A:
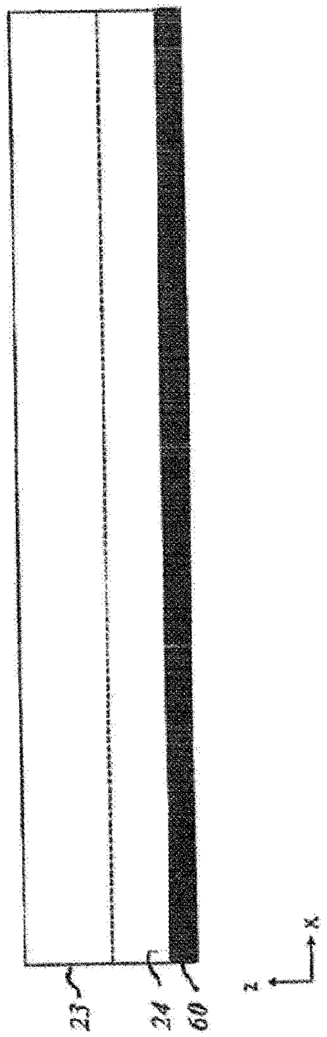
FIG. 12*a* to FIG. 12*f* each show sectional representations to illustrate a method for producing a see-through security element.
Figure 12B:
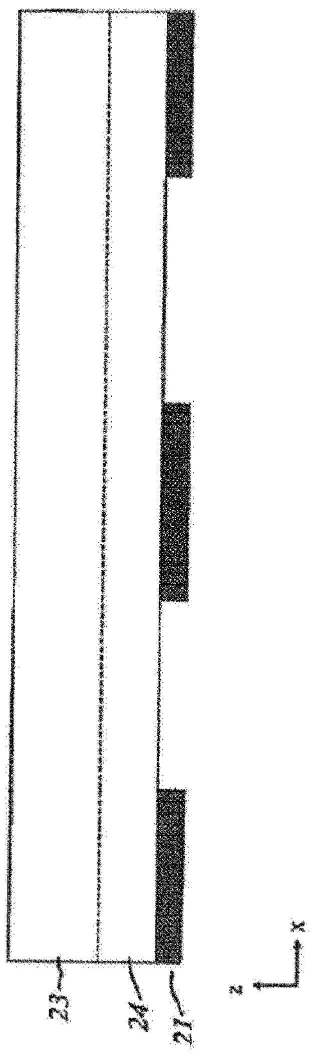

At first, as represented in figures FIG. 12*a* and FIG. 12*b*, the procedure is the same as already illustrated above with reference to FIGS. 11*a* and 11*b*. In this respect, reference is made to the above statements.

Figure 12C:
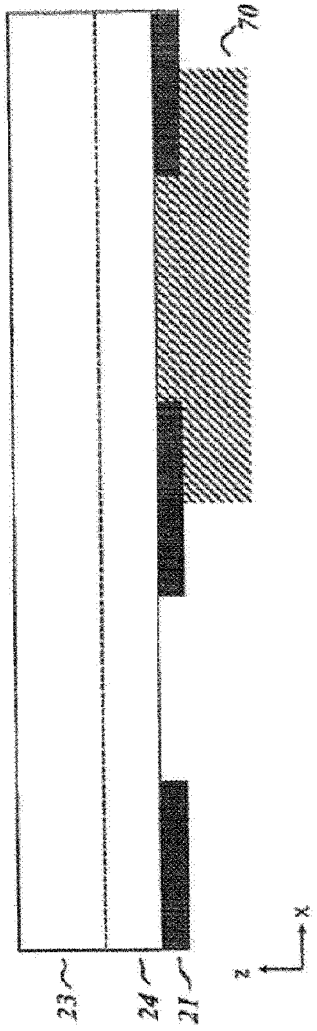
Figure 12D:
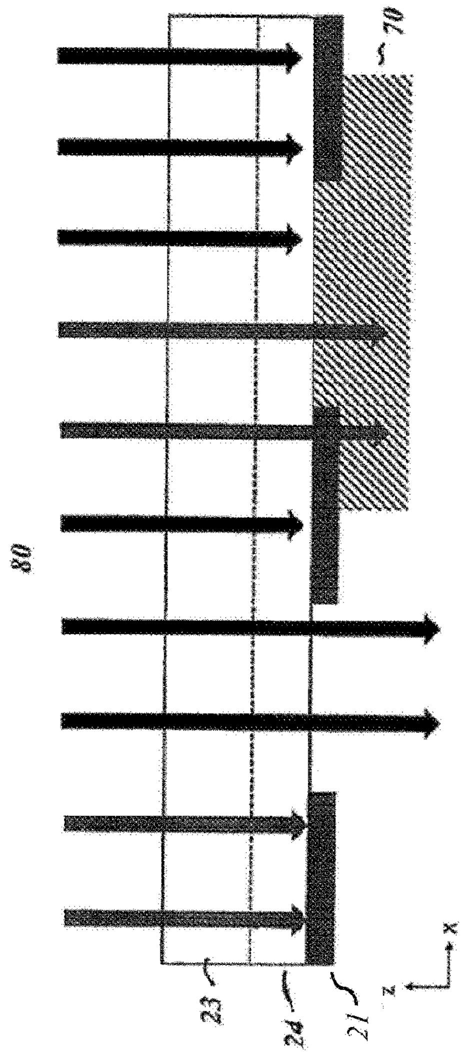
Figure 12E:
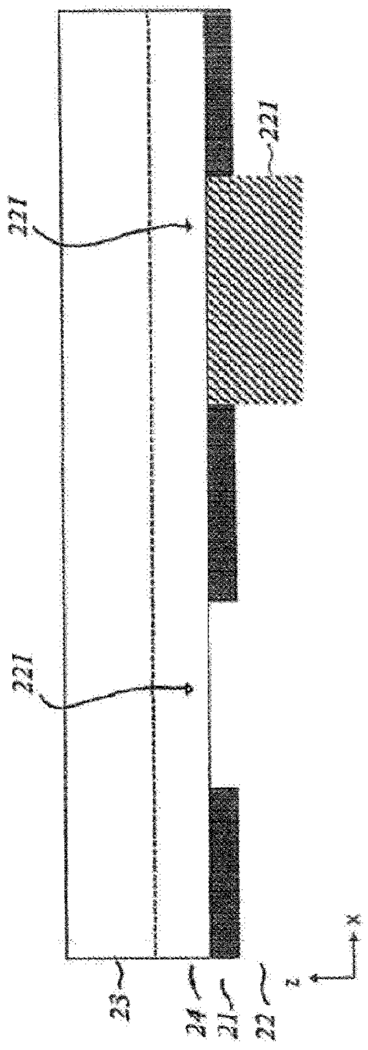

Then, as shown in FIG. 12*c*, the photoresist 70 is printed on only in areas, in particular by means of gravure printing, and is then exposed to light, as shown in FIG. 12*d*. By developing and subsequently washing off the unexposed photoresist, a perfect register is then achieved in an area between a first partial area 211 and a first partial area 221, as shown in FIG. 12*e*.

Further, it is also possible to form first partial areas 221 which only partially overlap with a first partial area 211.

Figure 12F:
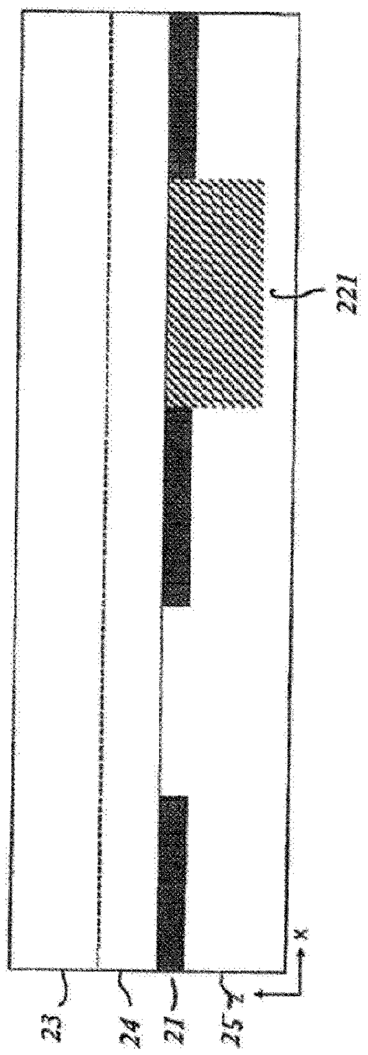

Then, as shown in FIG. 12*f*, optionally further layers, in particular the adhesive layer 25, are applied.

Further, it is also possible, in the method according to FIG. 12*a* to FIG. 12*f*, to print on differently dyed photoresist layers next to one another.

Here, the printing on is preferably effected such that the layer boundaries of the partial photoresist layer 70 and/or of the differently dyed photoresist layers 70 lie in the second partial areas 212. The advantage is hereby achieved that the insufficient register accuracy of the printing process used for the application of this layer is compensated for by the subsequent exposure process.

It is hereby possible, as already stated above, to produce first partial areas 221 formed in first partial areas 211 in perfect register accuracy, in which transmissive color filters are matched to different colors.

A further production method is now illustrated with reference to FIGS. 13*a* to 13*h:*

In this method, at first the procedure is the same as already with reference to FIGS. 12*a* to 12*c*. This is illustrated in figures FIG. 13*a* to FIG. 13*c*.

Figure 13A:
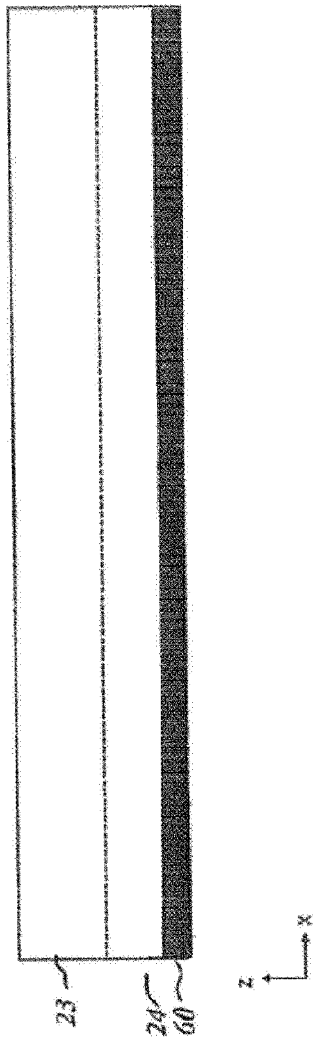
FIG. 13*a* to FIG. 13*h* each show sectional representations to illustrate a method for producing a see-through security element.
Figure 13B:
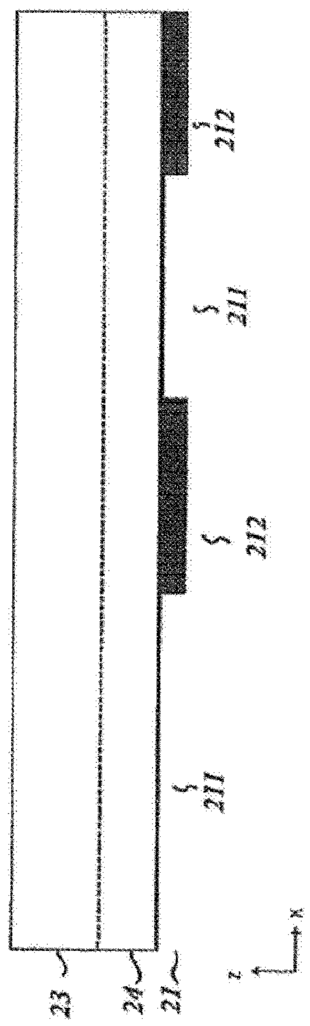
Figure 13C:
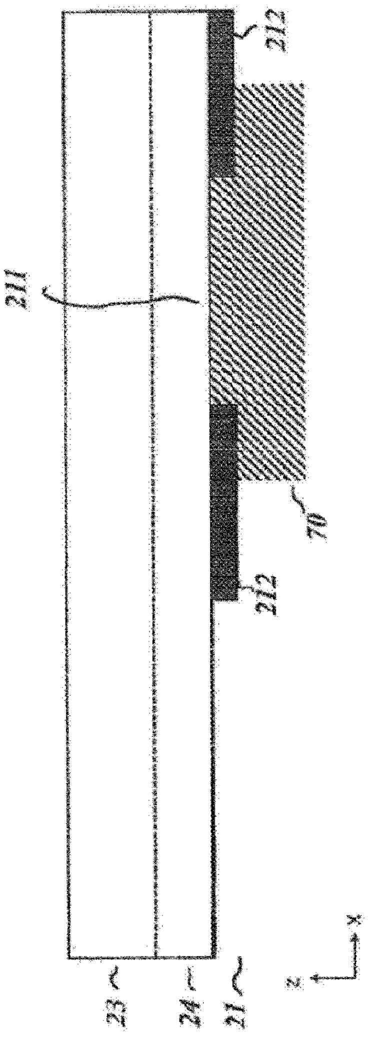

As shown in FIG. 13*c*, a negatively dyed photoresist is applied here such that it not only covers one or more first partial areas 211, but also a second partial area 212 surrounding them. Here, the photoresist layer 70 is applied by means of gravure printing, for example. Through this application, it is possible to absorb the considerable tolerances of a gravure printing process, which lie in the range of +/−0.1 mm transverse to the running direction of the printing process.

Figure 13D:
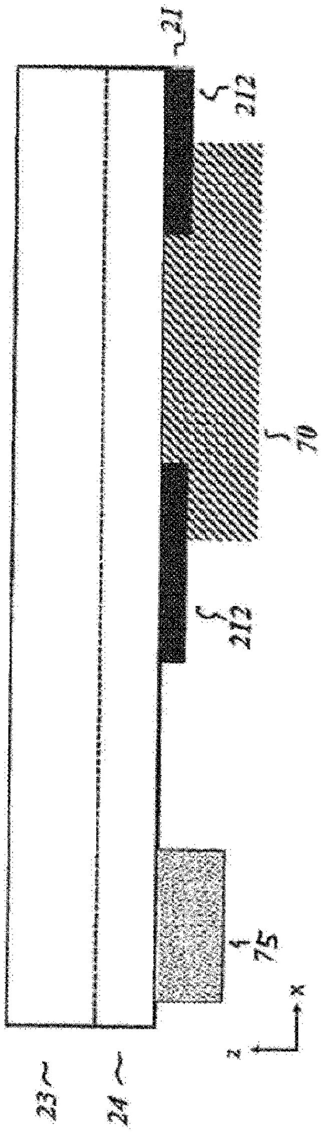

Then, as illustrated in FIG. 13*d*, a blocking layer 75 is partially printed on, for example imprinted by means of gravure printing.

The blocking layer 75 is a layer which is dyed and at the same time blocks the exposure of the photoresist to light with the radiation used. The blocking layer 75 is preferably a UV blocking layer. The blocking layer 75 blocks the incident UV radiation in at least a partial range of the UV length range which is used for the exposure, such that at most 25%, further preferably at most 15% of the incident intensity passes through the blocking layer 75.

By the UV wavelength range is preferably meant a range between 250 nm and 405 nm.

As already stated above, the blocking layer 75 is preferably dyed, preferably in a different color from the negative photoresist 70. Here, the blocking layer 75 is preferably dyed such that in transmission it forms a color filter which is matched to a color which differs from that of the dyed photoresist layer 70.

Further, it is also possible for such a blocking layer to be incorporated in the layer structure of the layers applied on top, for example the carrier layer 23, or the one or more varnish layers 24.

Figure 13E:
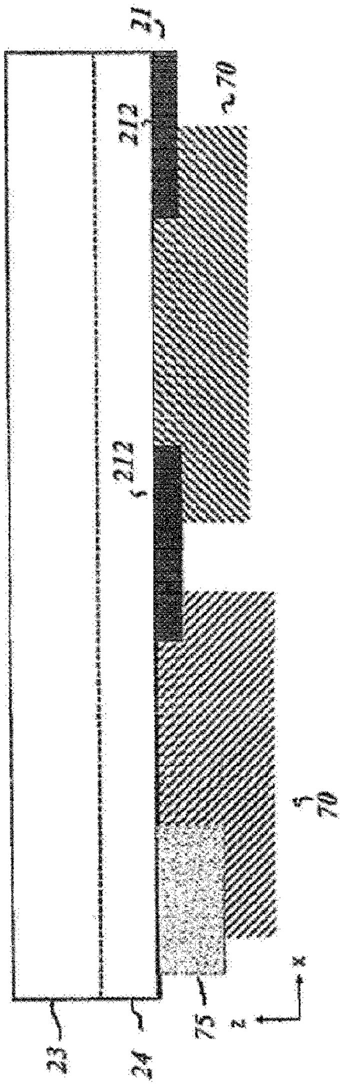

In an optional next step, as shown in FIG. 13*e*, another one or more further photoresist layers 70 can be printed on, which are preferably formed differently from the photoresist layer 70 already printed on, as already explained above. Here too, the partial coating with the one or more photoresist layers 70 is preferably effected such that the photoresist layers 70 partially overlap the blocking layer and/or the first partial areas 212, in order to correspondingly “absorb” the register fluctuation of the printing process, as already explained above.

Figure 13F:
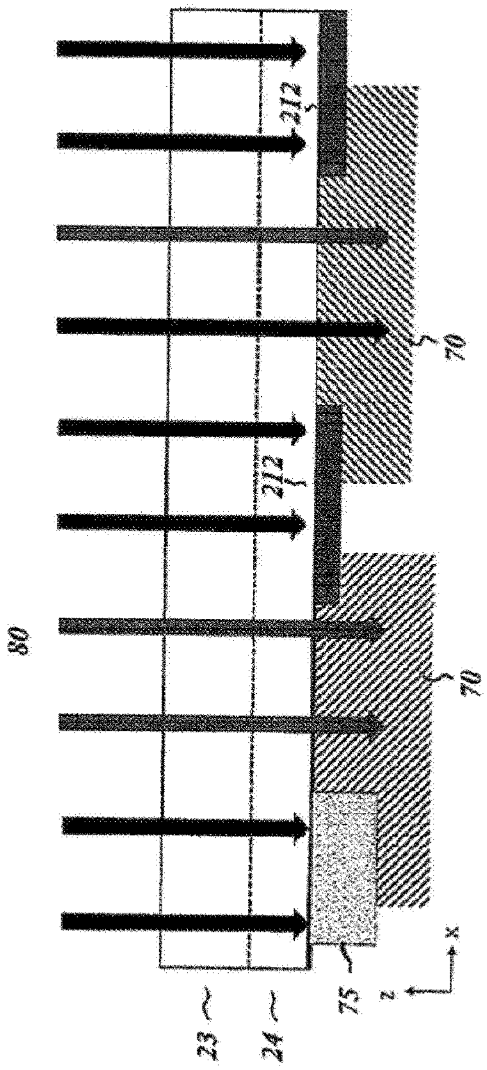
Figure 13G:
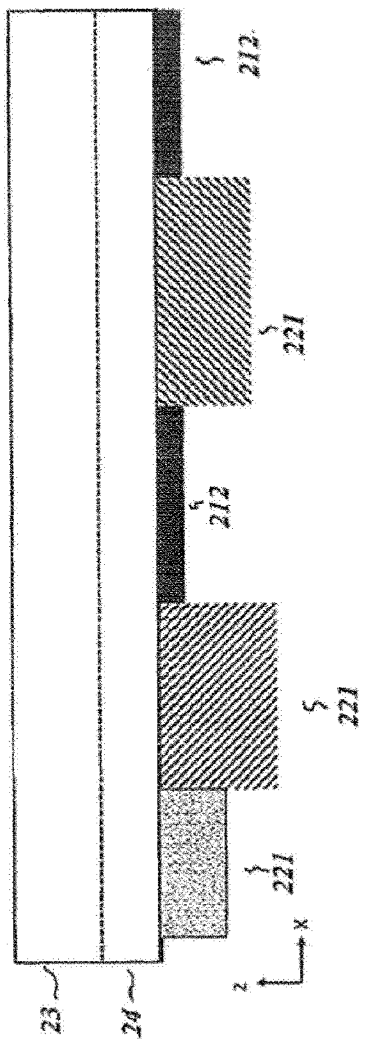

Then, as represented in FIG. 13*f*, a corresponding exposure to light is effected. Then, the unexposed areas of the photoresist layer 70 are washed off, as a result of which the perfect register between the differently dyed areas and the first partial areas 211 is achieved.

As already mentioned above, further intermediate layers, e.g. barrier layers and/or adhesion-promoter layers and/or stabilizing layers, can be introduced. In particular, undyed negative photoresist layers can be used here as structurable barrier layers. These then prevent the dye from diffusing out of the dyed negative photoresist into the blocking layer in an undesired manner, for example. This barrier layer can e.g. also prevent the partial dissolution of the metal layer 16 and thus widen the selection of the solvents which can be used in the washing process and/or extend the possible residence time.

Figure 13H:
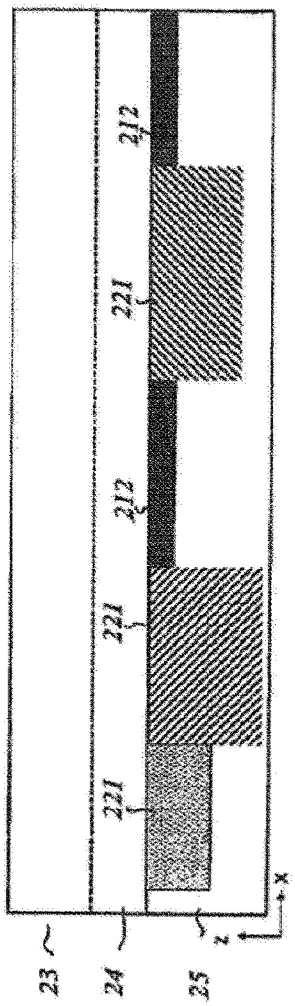

Then, as illustrated in FIG. 13*h*, another one or more further layers, for example the adhesive layer 25, can be applied.

Just like the dyed photoresist layer 70, the blocking layer 75 can be applied in part by means of digital printing, for example by means of inkjet printing. Individual markers of individual see-through security elements can thereby be produced.

A dyed photoresist layer 70 can also be applied over the whole surface and the exposure to light can be carried out only partially. This exposure to light can be effected via a mask, for example, and/or by means of controllable UV light-emitting diodes.

The procedure for producing a see-through security element 2 can further be as represented below with reference to FIG. 14*a* to FIG. 14*e:*

At first the procedure is the same as already above with reference to figures FIG. 11*a* and FIG. 11*b*. For this see FIG. 14*a* and FIG. 14*b*. In this respect, reference is made to the above statements.

Figure 14A:
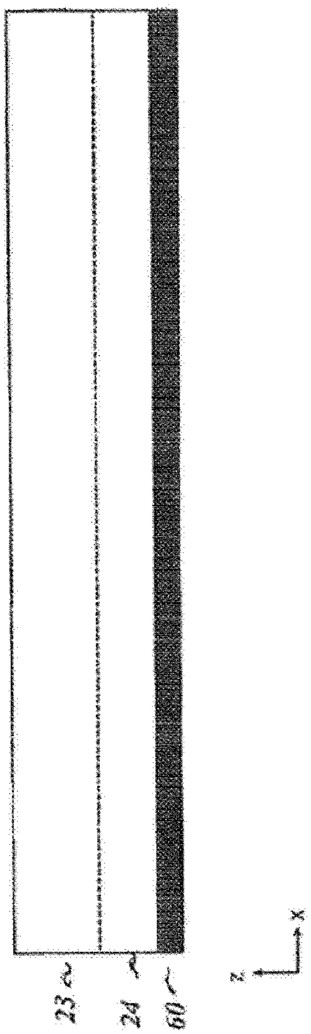
FIG. 14*a* to FIG. 14*f* each show sectional representations to illustrate a method for producing a see-through security element.
Figure 14B:
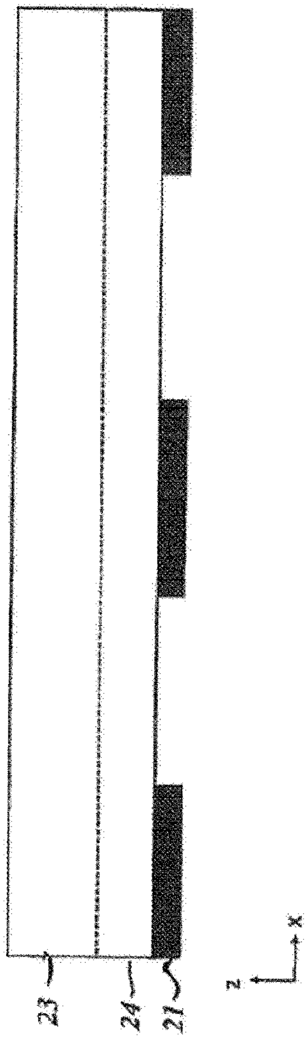
Figure 14C:
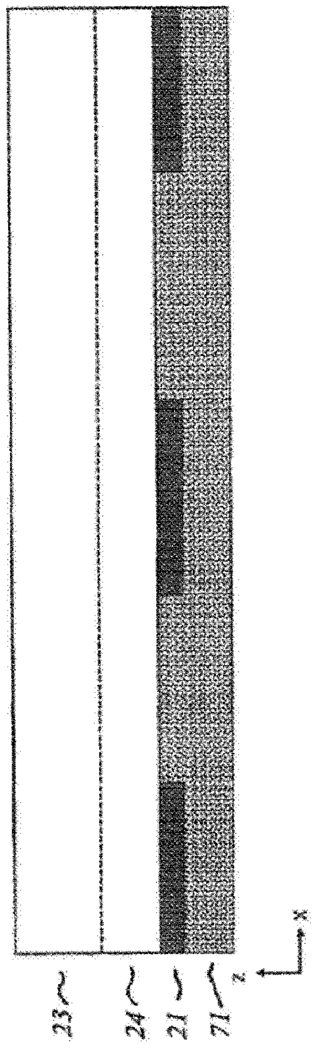

Then, a photochromic layer 71 is applied over the whole surface instead of a photoresist, as shown in FIG. 14*c*.

By a photochromic layer is here meant a layer which changes its colors permanently through exposure to a radiation with a suitable wavelength or obtains its colors permanently through exposure to radiation with a suitable wavelength. The suitable wavelength is in particular UV radiation.

Instead of applying the photochromic layer 71 over the whole surface this layer can also be printed on only in areas—in the same way as described previously with reference to figures FIG. 12 and FIG. 13—or different photochromic layers 71, which change their colors differently through irradiation or correspondingly obtain different colors during irradiation, are printed on next to one another.

Figure 14D:
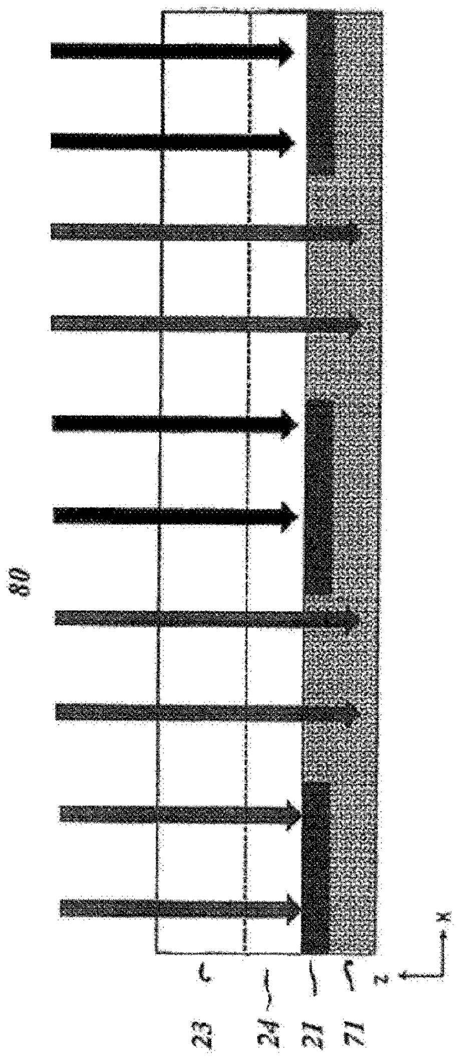
Figure 14E:
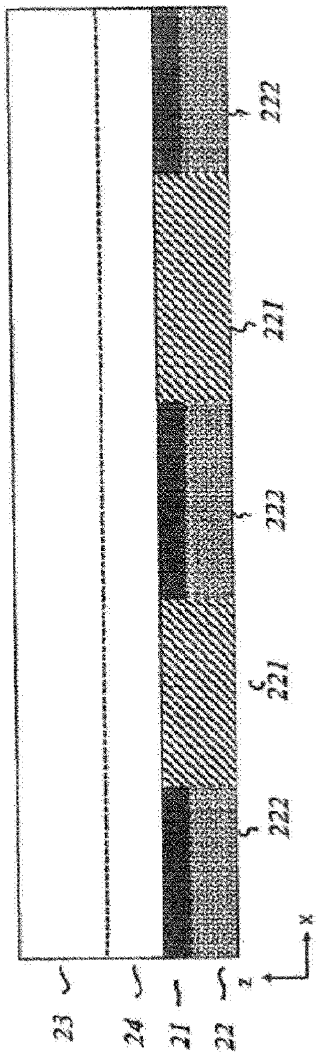

An exposure to light, preferably by means of UV radiation 80, is then effected. This is shown in FIG. 14*d*.

However, after the exposure to light, the exposed part of the photochromic layer is not washed off (as described in the previously described methods with respect to the photoresist layer 70). Rather, the exposed photochromic layer 71 remains completely in the layer stack. Here, due to the irradiation with the UV radiation 80, the photochromic layer 71 changes from transparent in the visible wavelength range to dyed in the visible wavelength range, preferably dyed such that in transmission the photochromic layer 71 in these areas forms a color filter which is matched to a predefined color.

Further, it is also possible for the photochromic layer 71 already to be dyed and for the color only to change in the irradiated areas. Here, the photochromic layer 71 is preferably formulated such that, in the exposed areas, as represented above, in transmission a corresponding color filter is formed and, in the unexposed areas, in reflection and/or transmission a color filter different from this is formed.

After exposure to light, the photochromic layer 21 thus correspondingly forms a second element 22, which, in first partial areas 221, in transmission forms a color filter which is matched to an assigned color, and, in second partial areas 222, is formed colorless/transparent or in reflection and/or transmission form a color filter which is matched to a color which is different from the color to which the color filters of the first partial areas 221 are matched.

Figure 14F:
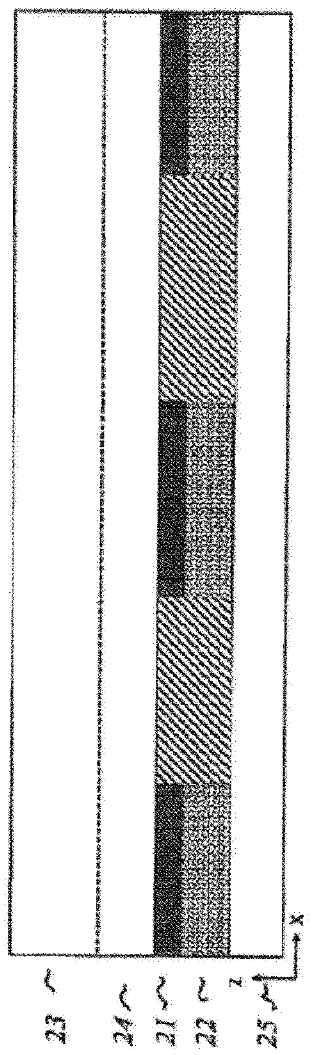

Then, as shown in FIG. 14*f*, the application of one or more further layers, for example the adhesive layer 25, is optionally also effected.

Figure 15A:
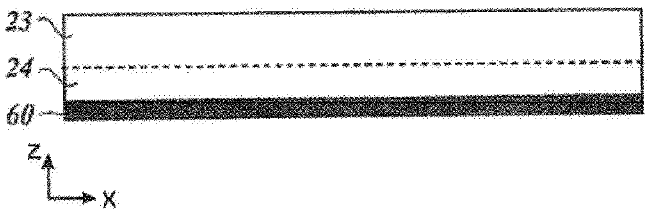
FIG. 15*a* to FIG. 15*i* each show sectional representations to illustrate a method for producing a see-through security element.
Figure 15B:
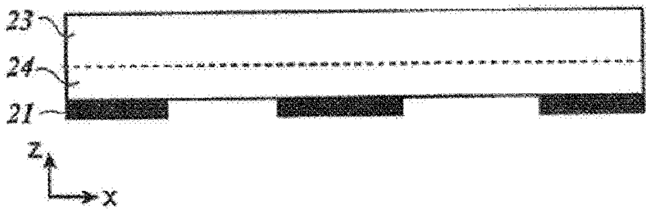

Further, it is also possible for the see-through security element to additionally also have a third element, which is provided underneath the second element. A preferred production method for producing such a see-through security element is described below with reference to figures FIG. 15*a* to FIG. 15*i*:

At first, as represented in figures FIG. 15*a* and FIG. 15*b*, the procedure is the same as already illustrated above with reference to FIG. 11*a* and FIG. 11*b*. In this respect, reference is made to the above statements.

Figure 15C:
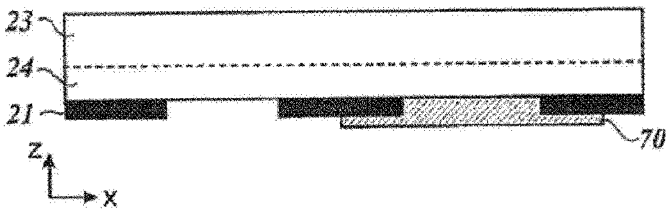
Figure 15D:
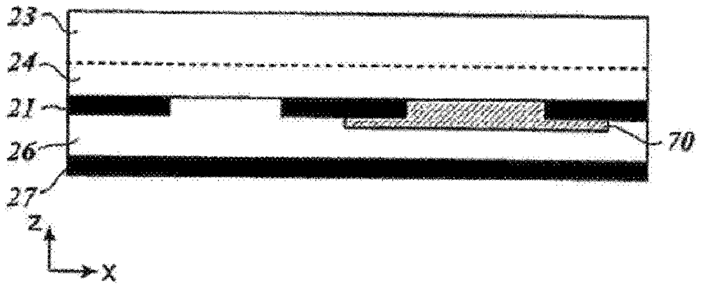

Then, as shown in FIG. 15*c*, the photoresist 70 is printed on preferably only in areas, in particular by means of gravure printing. However, instead of a photoresist, a dyed varnish can also be printed on. As illustrated in FIG. 12*c*, here the photoresist 70 overlaps at least one first partial area of the first element at least in areas. Further, it is also possible for the photoresist 70 to overlap the second partial area of the first element 21 at least in areas.

Then, as shown in FIG. 12*d*, an optional intermediate layer 26 and one or more layers 27 are applied.

The optional intermediate layer 26 here preferably consists of a transparent varnish layer, in particular a transparent layer with a layer thickness of preferably less than 5 μm. The optional intermediate layer 26 is preferably a replication layer, in which microstructures are molded by means of thermal replication and/or UV replication.

The one or more layers 27, by means of which the third element is then produced in the following processing steps, are then applied to the intermediate layer 26. The layer 27 is preferably an opaque metal layer which is formed like the metal layer 60 according to FIG. 11*a*. In this respect, reference is made to the previous statements.

It is further also advantageous if the metal layer 60 and the layer 27 consist of different metals, preferably consist of different metals with a different intrinsic color, such as for example consist of aluminum on the one hand and copper on the other.

Figure 15E:
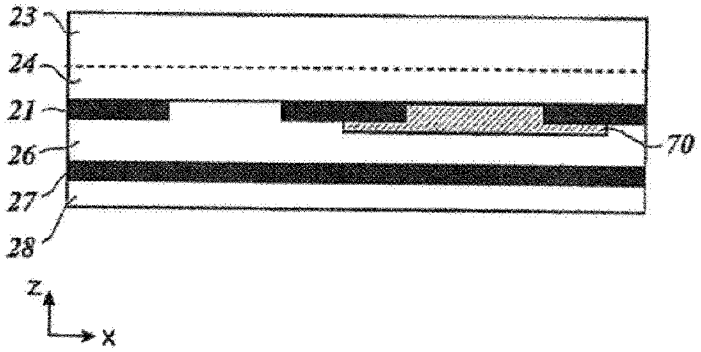

Then, as shown in FIG. 15*e*, a photoresist layer 28 is applied to the layer 27. The photoresist layer 28 can here be formed like the photoresist layer 70 according to FIG. 11*c*, so that, in this respect, reference is made to previous statements for this.

Figure 15F:
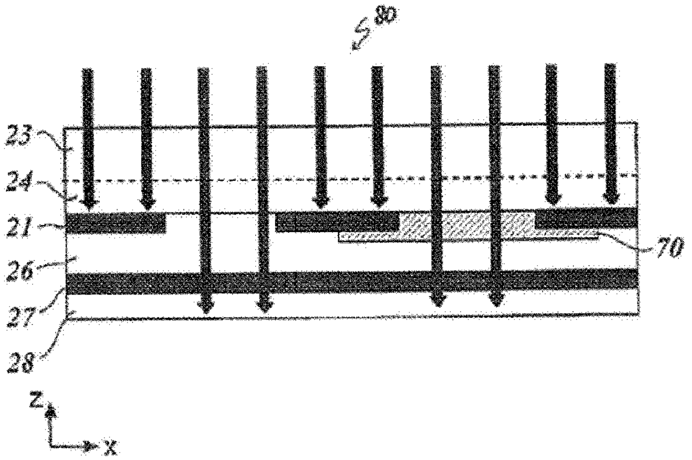
Figure 15G:
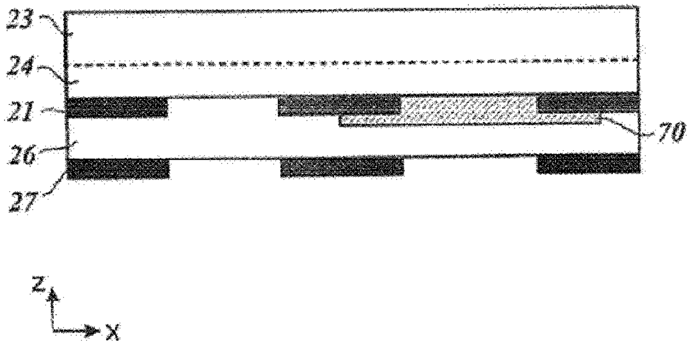

As illustrated in FIG. 15*f*, the photoresist layer 28 is then exposed to light with a suitable wavelength through the first element 21, for example by means of UV radiation 80. Here, the partial metal layer of the first element 21 acts as mask for the exposure to light. After the exposure to light, the layer 27 in the exposed area is removed and the remaining areas of the photoresist layer 28 are preferably stripped by means of etching or by means of a washing process, as represented in FIG. 15*g*. Here, the illuminated photoresist layer 28 is used as etching mask or washing mask in the etching and/or washing process.

Figure 15H:
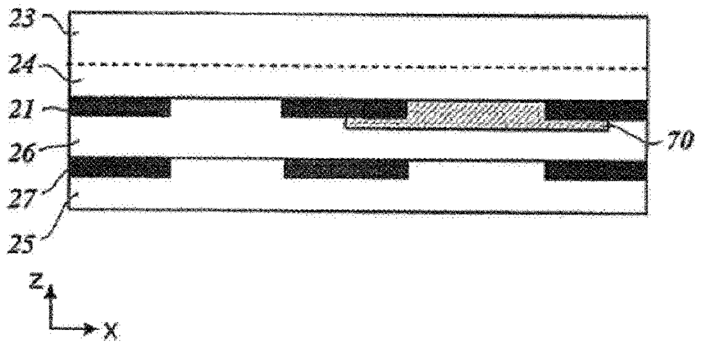
Figure 15I:
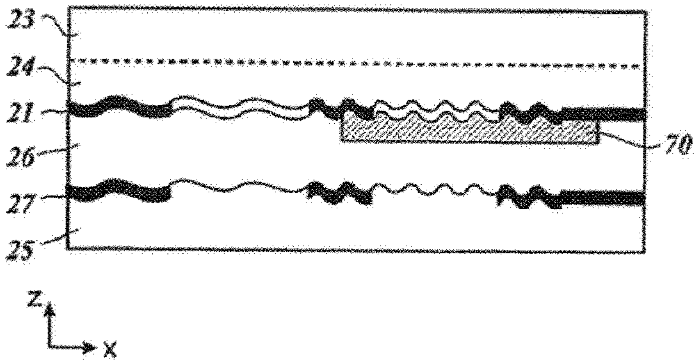

Subsequently, an adhesive and/or adhesion-promoting layer and/or a protective layer is then applied. In FIG. 15*h* it is here shown that the adhesive layer 25 is applied over the whole surface in a further step, for example by means of gravure printing.

As already explained above, a microstructure can be molded in the varnish layer 24 and in the intermediate layer 26, in particular by means of thermal replication and/or UV replication. This is illustrated correspondingly in FIG. 15*i*.

Here, on the one hand the same microstructures, but also different microstructures, can be molded in the varnish layer 24 and the intermediate layer 26 in order thus to achieve different, in particular optically variable effects, for example when viewed in reflected light from the front and rear sides.

LIST OF REFERENCE NUMBERS

1 security document
2 see-through security element
2*a*, 2*b* first/second see-through security element
10 substrate
11 window
12 security feature
21 first element
22 second element
23 carrier layer
24 varnish layer
25 adhesive layer
26 intermediate layer
27 layer
28 photoresist layer
31, 32 colored feature
33, 34, 35 feature
36 image information
41 first area
42 second area
60 layer
70 photoresist layer
71 photochromic layer
75 blocking layer
80 UV radiation
201 first main surface
202 second main surface
211, 221 first partial areas
212, 222 second partial areas

The invention claimed is:

1. A see-through security element with a front side formed by a first main surface of the see-through security element and a rear side formed by a second main surface of the see-through security element, wherein the see-through security element has at least one first area and/or at least one second area, when viewed perpendicular to the plane spanned by the first main surface, wherein the see-through security element has a first element, which has one or more transparent first partial areas and at least one reflective second partial area, wherein the see-through security element has a second element, which has one or more first partial areas, which in each case in transmission form a color filter matched to a respectively assigned color, and has at least one second partial area, which is formed colorless, or in transmission and/or reflection forms a color filter which is matched to a color which is not assigned to any of the one or more first partial areas of the second element, wherein the first partial areas of the first element and the first partial areas of the second element at least partially overlap when viewed perpendicular to the plane spanned by the first main surface, and wherein, when viewed perpendicular to the plane spanned by the first main surface, one or more of the first partial areas of the second element at least partially overlap one or more second partial areas of the first element, and wherein the see-through security element has a third element, the third element having one or more transparent first partial areas and at least one reflective second partial area, and wherein the second element is arranged in the see-through security element between the first element and the third element, and wherein the at least one second partial area of the third element is formed by at least one metallic layer or a sequence of layers comprising at least one metallic layer.

2. The see-through security element according to claim 1, wherein, in the first area of the see-through security element, one or more first partial areas of the first element and one or more first partial areas of the second element are arranged register-accurate relative to one another when viewed perpendicular to the plane spanned by the first main surface such that, when viewed in transmitted light, in the first area a first colored feature becomes visible.

3. The see-through security element according to claim 1, wherein, in the second area of the see-through security element, at least one of the first partial areas of the first element and at least one of the first partial areas of the second element are arranged register-accurate relative to one another when viewed perpendicular to the plane spanned by the first main surface such that, when viewed in transmitted light, in the second area a second colored feature becomes visible, which directly adjoins a third feature visible when viewed in reflected light from the front side and/or rear side.

4. The see-through security element according to claim 1, wherein, in the first and/or second area of the see-through security element, the first partial areas of the second element in each case have an overlap of not more 100 μm, with the at least one second partial area of the first element, when viewed perpendicular to the plane spanned by the first main surface.

5. The see-through security element according to claim 1, wherein, in the first and/or second area of the see-through security element, the first partial areas of the second element do not overlap with the at least one second partial area of the first element, when viewed perpendicular to the plane spanned by the first main surface.

6. The see-through security element according to claim 1, wherein, in the first and/or second area of the see-through security element, the at least one second partial area of the first element and the one or more first partial areas of the second element, when viewed perpendicular to the first main surface, adjoin each other without overlapping and with a gap with a width S of less than 300 μm.

7. The see-through security element according to claim 1, wherein, in the first area of the see-through security element, the one or more first partial areas of the first element are in each case completely surrounded by the at least one second partial area of the first element, and/or wherein, in the first area of the see-through security element, the one or more first partial areas of the second element are in each case completely surrounded by the at least one second partial area of the second element.

8. The see-through security element according to claim 1, wherein, in the first area of the see-through security element, the one or more first partial areas of the first element provided there and/or the one or more first partial areas of the second element provided there in each case have a dimension of less than 500 μm, in at least one lateral direction.

9. The see-through security element according to claim 1, wherein, in the first area the one or more first partial areas of the first element and the one or more first partial areas of the second element, in each case have a dimension between 5 μm and 300 μm, in at least one lateral direction.

10. The see-through security element according to claim 1, wherein, in the first area of the see-through security element, the first partial areas of the second element are in each case superposed with an assigned first partial area of the first element when viewed perpendicular to the plane spanned by the first main surface.

11. The see-through security element according to claim 1, wherein, in the first area, the one or more first partial areas of the first element and the one or more first partial areas of the second element are in each case shaped as a line and/or a raster element.

12. The see-through security element according to claim 11, wherein the raster elements are shaped as square, circular disk-shaped, rectangular and/or elliptical raster elements and/or as a raster element which forms an alphanumeric character.

13. The see-through security element according to claim 1, wherein, in the first and/or second area, the one or more first partial areas of the first element and the one or more first partial areas of the second element are in each case shaped as a thin, continuous line or portions of a line.

14. The see-through security element according to claim 1, wherein, in the first area, the one or more first partial areas of the first element are arranged in the form of a one- or two-dimensional raster.

15. The see-through security element according to claim 14, wherein the raster elements of the raster form a motif or partial motif of the first feature.

16. The see-through security element according to claim 1, wherein the raster is a linear raster in which the raster elements follow on from each other in the direction of a line.

17. The see-through security element according to claim 1, wherein the raster width of the raster and/or the size of the raster dots and/or the spacing of the lines and/or the width of the lines is varied locally.

18. The see-through security element according to claim 1, wherein, in the first area of the see-through security element, one or more first partial areas of the first element and one or more first partial areas of the second element are arranged relative to one another when viewed perpendicular to the plane spanned by the first main surface such that, when viewed in transmitted light in the first area, a first colored feature becomes visible, and wherein a design of the first colored feature is determined by the arrangement of the first partial areas of the first element and/or the first partial areas of the second element.

19. The see-through security element according to claim 18, wherein the first area of the see-through security element is the smallest possible rectangular area in which every edge of the rectangular area adjoins the first colored feature in each case at least at one point, when viewed perpendicular to the plane spanned by the first main surface.

20. The see-through security element according to claim 18, wherein, the at least one first partial area of the second element forms a motif which differs from the design of the overlapped first partial area of the first element and becomes visible in the second area as a colored second feature when viewed in transmitted light.

21. The see-through security element according to claim 20, wherein, in the second area, a fourth feature determined by the design of at least one of the first partial areas of the first element becomes visible when viewed in transmitted light.

22. The see-through security element according to claim 20, wherein, in the first and/or second area, a third feature determined by at least one of the second partial areas of the first element becomes visible when viewed in reflected light from the front side and/or a third feature determined by at least one of the second partial areas of the first element becomes visible when viewed in reflected light from the rear side.

23. The see-through security element according to claim 1, wherein the surface proportion F of the one or more first partial areas of the first element is smaller than 20%, wherein the surface proportion F is the ratio of the surface area of the first area which is occupied by the one or more first partial areas of the first element to the surface area of the first area which is occupied by the one or more first partial areas and the at least one second partial area of the first element.

24. The see-through security element according to claim 1, wherein the at least one second partial area of the first element completely surrounds the first area of the see-through security element, when viewed perpendicular to the plane spanned by the first main surface.

25. The see-through security element according to claim 24, wherein, starting from the first area of the see-through security element, the at least one second partial area of the first element completely surrounds the first area of the see-through security element by at least a distance d, when viewed perpendicular to the plane spanned by the first main surface, wherein d is larger than 0.5 mm.

26. The see-through security element according to claim 1, wherein in the second area of the see-through security element, at least one of the first partial areas of the second element overlaps with a first partial area of the first element when viewed perpendicular to the plane spanned by the first main surface such that the at least one first partial area of the second element only partially overlaps the first partial area of the first element.

27. The see-through security element according to claim 1, wherein, when viewed perpendicular to the plane spanned by the first main surface, the first partial areas of the first element and the first partial areas of the third element at least partially overlap, and/or wherein, when viewed perpendicular to the plane spanned by the first main surface, the at least one second partial area of the first element and the at least one second partial area of the third element at least partially overlap, are superposed.

28. The see-through security element according to claim 1, wherein, when viewed perpendicular to the plane spanned by the first main surface, one or more of the first partial areas of the second element at least partially overlap one or more second areas of the third element.

29. d) The see-through security element according to claim 1, wherein the one or more first partial areas of the first element and/or third element have a reflectivity of more than 10%, averaged over the visible wavelength range.

30. The see-through security element according to claim 1, wherein the at least one second partial area of the first element and/or of the third element is formed by at least one metallic layer or a sequence of layers comprising at least one metallic layer.

31. The see-through security element according to claim 1, wherein the at least one second partial area of the first element and/or of the third element has a second relief structure and at least one reflective layer, which follows the contour of the second relief structure on at least one main surface.

32. The see-through security element according to claim 31, wherein, when viewed in reflected light from the front side and/or rear side, the second relief structure provides an optically variable feature.

33. The see-through security element according to claim 31, wherein, in the first area of the see-through security element, one or more first partial areas of the first element and one or more first partial areas of the second element are arranged relative to one another when viewed perpendicular to the plane spanned by the first main surface such that, when viewed in transmitted light in the first area, a first colored feature becomes visible, and wherein, when viewed in transmitted light, the second relief structure provides an optically variable feature and/or an optically variable design elements in the first colored feature when viewed in transmitted light.

34. The see-through security element according to claim 1, wherein the one or more first partial areas of the first element and/or of the third element have a first relief structure.

35. The see-through security element according to claim 1, wherein, in the first and/or second area of the see-through security element, the first partial areas of the second element are assigned to two or more groups of first partial areas, and wherein a respective color is assigned to each of the groups of first partial areas, wherein the colors assigned to the groups differ from each other, and the color filter which is formed in the respective first partial areas is matched to the respectively assigned color.

36. The see-through security element according to claim 1, wherein, in each case a first color is assigned to a first group of first partial areas of the second layer, and wherein, in each case a second color is assigned to a second group of first partial areas of the second layer, and wherein the first and second colors differ from each other.

37. A method for producing a see-through security element according to claim 1, wherein, one or more color layers, the solubility and/or color filtering effect of which are altered by means of exposure to light, are applied to the first element and wherein the one or more color layers are exposed to light through the first element using the first element as exposure mask.

38. The method for producing a see-through security element according to claim 37, wherein the first element has at least one metal layer, which is not provided in the one or more first partial areas of the first element.

39. The method for producing a see-through security element according to claim 37, wherein one or more of the color layers are formed in each case by a dyed negative photoresist.

40. A security document with a see-through security element according to claim 1.

* * * * *